(12) United States Patent
Sakurai et al.

(10) Patent No.: US 7,420,903 B2
(45) Date of Patent: Sep. 2, 2008

(54) ELECTRONIC EQUIPMENT, HIGHLIGHTING METHOD, AND PROGRAM INSTALLED IN THE EQUIPMENT

(75) Inventors: Atsushi Sakurai, Kanagawa (JP); Hayato Koizumi, Tokyo (JP); Junichiro Sakata, Tokyo (JP); Tomoyuki Oguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 571 days.

(21) Appl. No.: 10/976,071

(22) Filed: Oct. 29, 2004

(65) Prior Publication Data

US 2005/0147384 A1    Jul. 7, 2005

(30) Foreign Application Priority Data

Nov. 7, 2003    (JP) ............................. 2003-378744

(51) Int. Cl.
    G11B 7/00    (2006.01)
(52) U.S. Cl. ............... 369/53.2; 369/53.12; 369/53.37; 386/46; 386/69; 386/70; 386/83; 386/95
(58) Field of Classification Search ............... 386/46, 386/83, 95; 369/30.1, 53.2, 47.55, 53.12, 369/53.37
    See application file for complete search history.

(56) References Cited

U.S. PATENT DOCUMENTS 5,727,060 A * 3/1998 Young ..................... 348/734
6,914,863 B2 * 7/2005 Ono ........................ 369/53.12

FOREIGN PATENT DOCUMENTS

| JP | 11-273224   | 10/1999 |
|----|-------------|---------|
| JP | 2000-138886 | 5/2000  |
| JP | 2001-245233 | 9/2001  |
| JP | 2002-84484  | 3/2002  |
| JP | 2002-117024 | 4/2002  |
| JP | 2003-304477 | 10/2003 |

* cited by examiner

*Primary Examiner*—Thai Tran
*Assistant Examiner*—Mishawn Dunn
(74) *Attorney, Agent, or Firm*—Oblon, Spivak, McClelland, Maier & Neustadt, P.C.

(57) ABSTRACT

Disclosed is electronic equipment enjoying improved ease of use, and a highlighting method and a program to be implemented or installed in the electronic equipment. For example, a user performs manipulations so as to reproduce a content up to the middle of the content, and then turns off a power supply. When the user turns on the power supply next, a playback selection menu screen image is displayed and "Playback from the middle thereof" is highlighted. Consequently, when the user wants to reproduce the content from the middle of the content, the user need not worry about whether to reproduce the content from the beginning or the middle thereof. The user should merely finalize the highlighted item. This would prove user-friendly and helpful. When the electronic equipment is used outdoors or the like, the number of manipulations to be performed on the equipment is smaller than the number of manipulations conventionally performed.

14 Claims, 27 Drawing Sheets

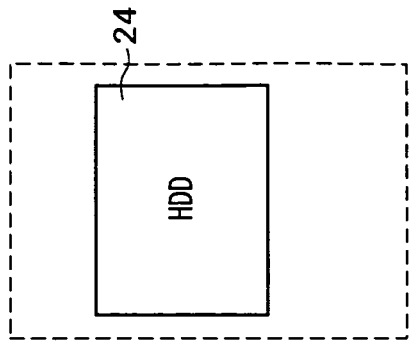
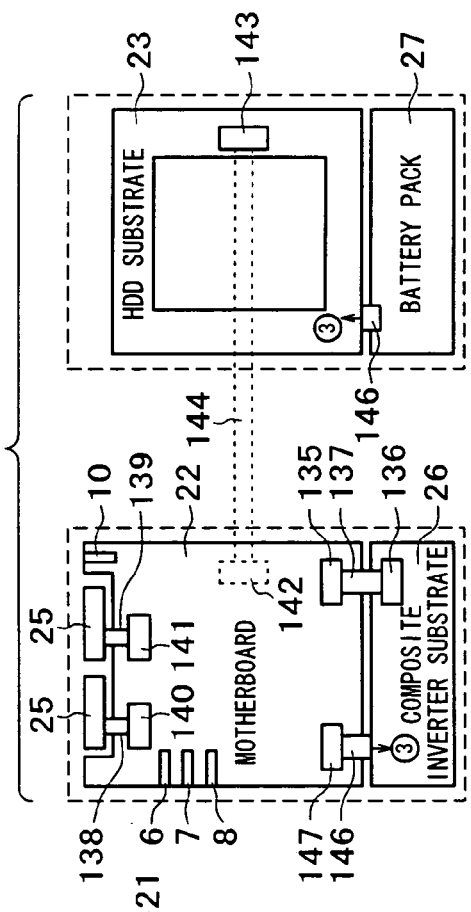
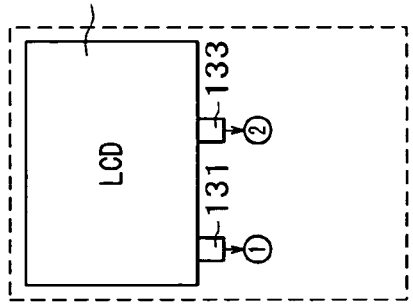
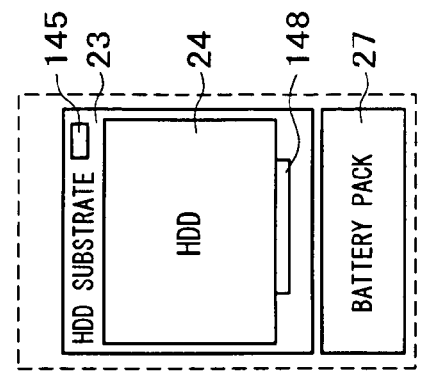
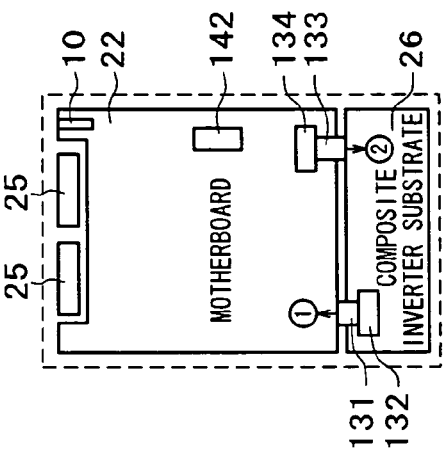

| TITLE | DATE OF CREATION | RECORDING TIME | CHANNEL NAME | COUNTER INFORMAION |
|---|---|---|---|---|
| TUESDAY ROAD SHOW | 2003. 1. 13. 0:30 | 2:00:00 | 10ch TV TOKYO | 0:00:00 |
| TONIGHT RECIPE | 2003. 1. 26. 15:00 | 0:30:00 | 12ch TV ASAHI | 0:14:45 |
| SUNDAY SUSPENSE DRAMA | 2003. 8. 21. 22:00 | 2:30:00 | 8ch FUJI TV | 1:05:19 |
| BOXING FLYWEIGHT TITLE MATCH | 2003. 10. 20. 20:00 | 2:00:00 | 6ch TBS | 0:00:00 |
| ... | ... | ... | ... | ... |

F I G . 1 1

INTRA-PICTURE INFORMATION FILE
111

| | |
|---|---|
| ID NUMBER OF LEADING SECTOR CONTAINING INTRA-PICTURE | OFFSET FROM LEADING SECTOR CONTAINING INTRA-PICTURE |
| ID NUMBER OF LAST SECTOR CONTAINING INTRA-PICTURE | OFFSET FROM LAST SECTOR CONTAINING INTRA-PICTURE |
| HOUR (NUMBER OF TENS) | HOUR (NUMBER OF UNITS) |
| MINUTE (NUMBER OF TENS) | MINUTE (NUMBER OF UNITS) |
| SECOND (NUMBER OF TENS) | SECOND (NUMBER OF UNITS) |
| AUDIO OUTPUT MODE | |

112 — rows 1-2
113 — rows 3-5
114 — row 6

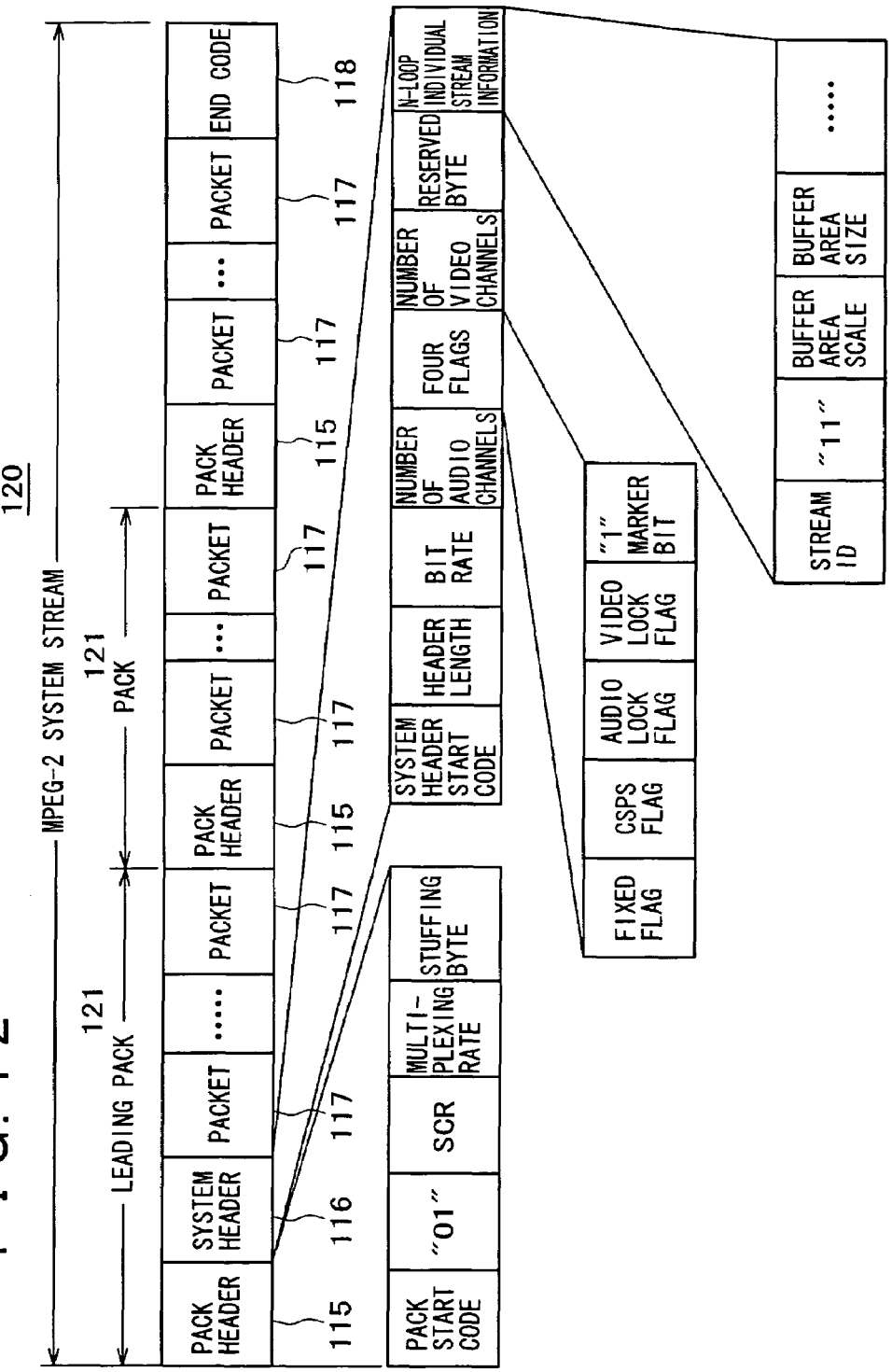

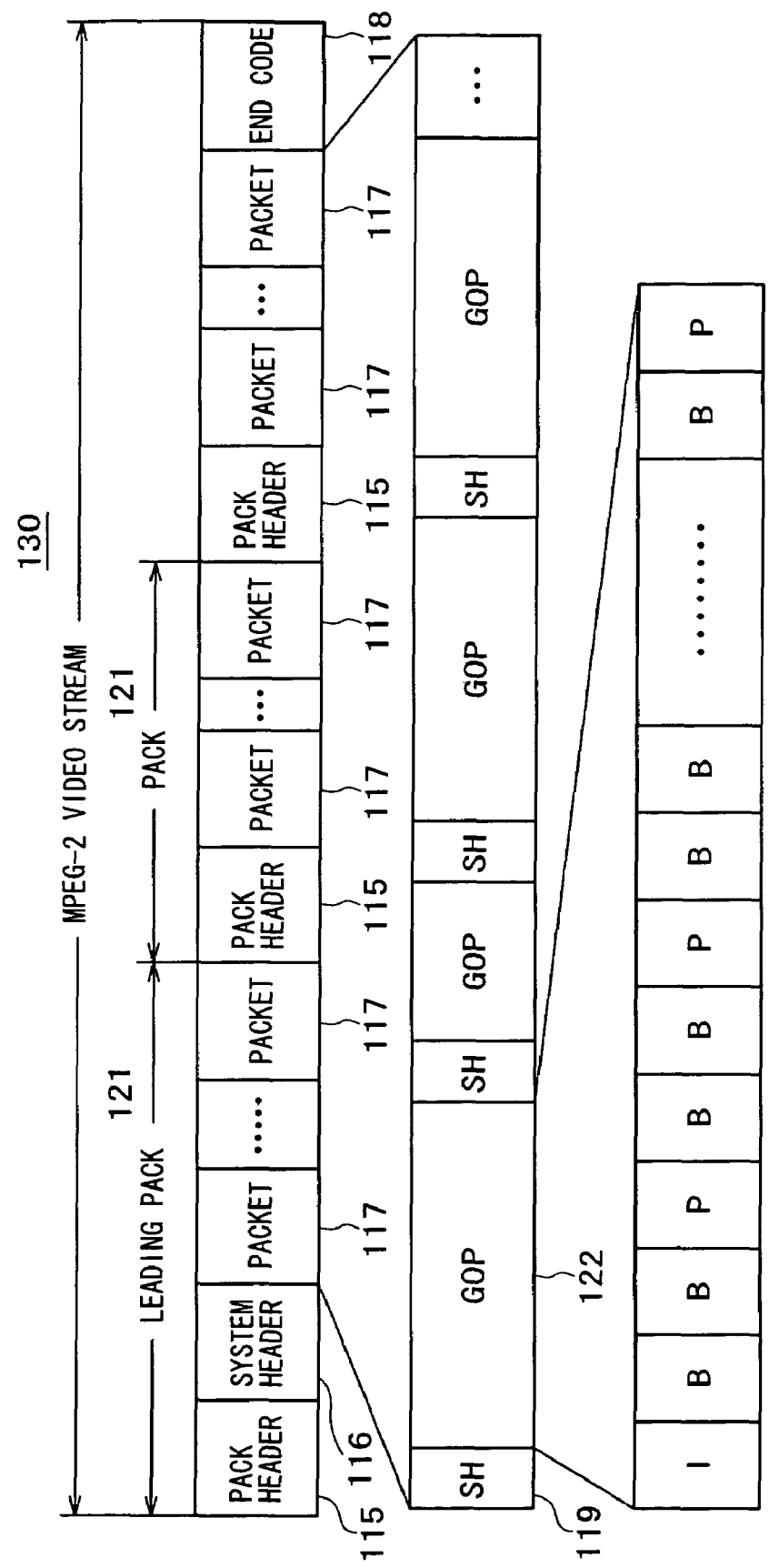

| | |
|---|---|
| 1 | CLUSTER NUMBER ASSIGNED TO CLUSTER A |
| 2 | CLUSTER NUMBER ASSIGNED TO CLUSTER T |
| 3 | CLUSTER NUMBER ASSIGNED TO CLUSTER B |
| 4 | CLUSTER NUMBER ASSIGNED TO CLUSTER M |
| 5 | CLUSTER NUMBER ASSIGNED TO CLUSTER L |
| 6 | CLUSTER NUMBER ASSIGNED TO CLUSTER F |
| 7 | CLUSTER NUMBER ASSIGNED TO CLUSTER S |
| 8 | CLUSTER NUMBER ASSIGNED TO CLUSTER V |

⋮  ⋮

| TITLE | PLAYBACK TABLE ID NUMBER | INTRA-PICTURE INFORMATION FILE ID NUMBER |
|---|---|---|
| TUESDAY ROAD SHOW | α | f |
| TONIGHT RECIPE | β | c |
| SUNDAY SUSPENSE DRAMA | γ | g |
| BOXING FLYWEIGHT TITLE MATCH | δ | r |
| ⋮ | ⋮ | ⋮ |

| TITLE OF CONTENT | ID NUMBER OF LEADING SECTOR CONTAINING AN INTRA-PICTURE AT THE POSITION OF WHICH REPRODUCTION HAS BEEN SUSPENDED | COUNTER INFORMATION |
|---|---|---|
| TONIGHT RECIPE | 10,547 | 0:14:45 |
| SUNDAY SUSPENSE DRAMA | 52,368 | 1:05:19 |
| ... | ... | ... |

ELECTRONIC EQUIPMENT, HIGHLIGHTING METHOD, AND PROGRAM INSTALLED IN THE EQUIPMENT

BACKGROUND OF THE INVENTION

1. Field of the Invention

The present invention relates to electronic equipment capable of reproducing contents such as a motion picture and sounds, and a highlighting method and a program to be implemented or installed in the electronic equipment.

2. Description of the Related Art

In the past, a device with a built-in hard disk drive (HDD) has been commercialized as a recording/playback device for recording and reproducing contents that include television (TV) broadcast data. The device has the contents recorded and preserved in the HDD.

Such an HDD recording device can display, for example, a menu screen image, which presents a list of titles of contents recorded and preserved in an HDD, on a monitor of a television or the like. A user uses, for example, a remote controller or the like to select a desired content through the title menu screen image, whereby the user can reproduce the recorded content. After the user selects the desired content through the title menu screen image, the user presses a Finalize button. A submenu screen image is then displayed. Through the submenu screen image, the user can select whether the selected content should be reproduced from the beginning or from the middle thereof. When it says that a content is reproduced from the middle thereof, it means that the user wants to reproduce the content from a position at which the user has previously suspended the reproduction (refer to, for example, Non-patent Document 1).

Non-patent Document 1 can be downloaded from a Web page specified with http://www.sony.jp/ServiceArea/impdf/ (as of the date of application).

[Non-patent Document 1] Operation Manual for Channel Server CSV-E77

However, the device described in Non-patent Document 1 has a drawback that: when reproduction of a content is suspended in the middle thereof or when the power supply of the device is turned off in the middle of reproduction of a content, if a user wants to reproduce the content again, the user must select the desired content through the list of titles of a plurality of contents through the title menu screen image, and designate reproduction or reproduction from the middle of a content through the submenu screen image using the remote controller or the like. For example, the user may forget previously enjoying a content to the middle of the content. In this case, the user may be at a loss whether to designate reproduction from the beginning or reproduction from the middle of a content.

On the other hand, assuming that equipment for reproducing contents is designed compactly, if a user uses the equipment outdoors, the number of manipulations to be performed on buttons included in the equipment is required to be as small as possible so that the user will be relieved from the labor of performing the manipulations. In particular, when the user uses the equipment outdoors, if the number of manipulations to be performed on the buttons is large, it will annoy the user. Besides, the user is likely to perform incorrect manipulations.

SUMMARY OF THE INVENTION

The present invention attempts to break through the foregoing circumstances. An object of the present invention is to provide electronic equipment enjoying improved ease of use, and a highlighting method and a program to be implemented or installed in the electronic equipment.

In order to accomplish the above object, according to one aspect, electronic equipment of the present invention comprises: a display unit on which a playback selection menu for prompting a user to select either head playback in which a content is reproduced from the beginning or middle playback in which the content is reproduced from the middle thereof can be displayed; a reproducing means for displaying the content on the display unit and thus reproducing it; a highlighting means for highlighting one of menu items, which are contained in the playback selection menu, on the display unit so that the menu item will be selected; a means for in response to a power supply turnoff instruction issued during reproduction of the content by the reproducing means, preserving information on a middle position in the content at which reproduction has been suspended, and turning off the power supply; and a control unit that when the power supply is turned on, if the information on the middle position is preserved, extends control so that the playback selection menu will be displayed on the display unit and the highlighting means will highlight a menu item indicating middle playback.

According to the aspect, assume that a user performs manipulations so as to reproduce a content up to the middle of the content and then turns off a power supply. When the user turns on the power supply next, the playback selection menu is displayed and a menu item indicating middle playback is highlighted. Consequently, when a user wants to reproduce the content from the middle of the content, the user need not worry about whether to reproduce the content from the beginning or from the middle thereof. The user should merely finalize the highlighted menu item. This results in improved user-friendliness. Moreover, if the electronic equipment is used outdoors or the like, the number of manipulations to be performed on the equipment is reduced to be smaller than that conventionally performed.

According to the aspect, when a plurality of contents is available, the electronic equipment memorizes the reproduced states of the contents (whether the contents have been reproduced from the beginning or from the middle thereof). More particularly, assuming that reproduction of a certain content (for example, a first content) is suspended and a second content other than the first content is reproduced, the present invention memorizes the reproduced states of the first and second contents. Consequently, if a user suspends reproduction of the second content or if reproduction of the second content is completed and automatically terminated, the first content is reproduced from the middle thereof. Thus, ease of use improves.

According to the aspect, when the power supply is turned on, whether information on a middle position is preserved is verified. If the information on a middle position is verified not to be preserved, the playback selection menu is displayed on the display unit. The highlighting means is instructed to highlight the menu item indicating head playback. If the information on a middle position is not preserved, the menu item indicating head playback is highlighted. This helps a user grasp that reproduction of the content is not previously suspended in the middle thereof.

According to the aspect, the electronic equipment further comprises a counter means for displaying a counter indicator, which indicates a reproduced position in the content or a reproduction time, together with the playback selection menu on the display unit. This helps a user grasp a middle position in the content or a time instant, at which reproduction is suspended, through the playback selection menu, and would prove useful.

According to the aspect, the electronic equipment further comprises a means for when the control unit extends control so as to highlight the menu item indicating middle playback, displaying an image, which is disposed at a middle position in the content, together with the playback selection menu on the display unit. This helps a user grasp an image, at the position of which reproduction of the content is suspended, through the playback selection menu, and would prove useful.

According to the aspect, the display unit can display a title menu listing titles of contents; and the electronic equipment further comprises a counter means for displaying a counter indicator, which indicates a reproduced position in a content or a reproduction time, together with the title menu on the display unit. This helps a user grasp a middle position in the content or an intermediate time instant, at which reproduction of the content is suspended, through the title menu, and would prove useful. In particular, when the titles of a plurality of contents are listed in the title menu, if the counter means displays the counter indicator relative to each of the contents, it would prove user-friendly and improve ease of use.

According to another aspect, electronic equipment of the present invention comprises: a reproduction control means for controlling reproduction of a content and suspension of the reproduction; a display unit on which a playback selection menu for prompting a user to select either head playback in which the content is reproduced from the beginning or middle playback in which the content is reproduced from the middle thereof, and the content being reproduced by the reproduction control means are displayed; a highlighting means for highlighting one of menu items, which are contained in the playback selection menu, on the display unit so that the menu item will be selected; and a control unit that when reproduction of the content is suspended by the reproduction control means, extends control so that the playback selection menu will be displayed on the display unit and the highlighting means will highlight the menu item indicating middle playback.

According to the aspect, for example, when a user performs manipulations to reproduce a content and suspend the reproduction, control is extended so that the playback selection menu will be displayed and the menu item indicating middle playback will be highlighted. Consequently, when a user wants to reproduce the content from the middle thereof, the user need not worry about whether to reproduce the content from the beginning or the middle thereof. The user should merely finalize the highlighted menu item. This would prove user-friendly and helpful. Moreover, when the electronic equipment is used outdoors, the number of manipulations to be performed on the equipment can be reduced.

According to still another aspect, a highlighting method of the present invention comprises: a step of displaying on a display unit a playback selection menu that prompts a use to select either head playback in which a content is reproduced from the beginning or middle playback in which the content is reproduced from the middle thereof; a step of highlighting on the display unit one of menu items contained in the playback selection menu so that the menu item will be selected; a step of reproducing the content according to the highlighted menu item contained in the playback selection menu; a step of in response to a power supply turnoff instruction issued during reproduction of the content, preserving information on a middle position in the content at which reproduction has been suspended, and turning off the power supply; and a step of when the power supply is turned on, if the information on a middle position is preserved, displaying the playback selection menu on the display unit and highlighting a menu item indicating middle playback.

According to the aspect, when the power supply is turned on, the playback selection menu is displayed and the menu item indicating middle playback is highlighted. A user need not worry about whether to reproduce a content from the beginning or from the middle thereof. The user should merely finalize the highlighted menu item. This would prove user-friendly and helpful for, for example, outdoor use because the number of manipulations can be reduced.

According to a further aspect, a highlighting method of the present invention comprises: a step of displaying on a display unit a playback selection menu that prompts a user to select either head playback in which a content is reproduced from the beginning or middle playback in which the content is reproduced from the middle thereof; a step of highlighting on the display unit one of menu items, which are contained in the playback selection menu, so that the menu item will be selected; a step of reproducing the content according to the highlighted menu item contained in the playback selection menu; a step of suspending reproduction of the content in the middle of the reproduction; and a step of when reproduction of the content is suspended, displaying the playback selection menu on the display unit and highlighting a menu item indicating middle playback.

According to the aspect, when reproduction of a content is suspended, the playback selection menu is displayed and the menu item indicating middle playback is highlighted. When a user wants to reproduce the content from the middle thereof, the user need not worry about whether to reproduce the content from the beginning or the middle thereof. The user should merely finalize the highlighted menu item. Thus, ease of use improves.

According to a still further aspect, a program of the present invention instructs a computer to execute: a step of displaying on a display unit a playback selection menu that prompts a user to select either head playback in which a content is reproduced from the beginning or middle playback in which the content is reproduced from the middle thereof; a step of highlighting on the display unit one of menu items contained in the playback selection menu so that the menu item will be selected; a step of reproducing the content according to the highlighted menu item contained in the playback selection menu; a step of in response to a power supply turnoff instruction issued during reproduction of the content, preserving information on a middle position in the content at which reproduction has been suspended, and turning off the power supply; and a step of when the power supply is turned on, if the information on the middle position is preserved, displaying the playback selection menu on the display unit and highlighting a menu item indicating middle playback.

According to another aspect, a program of the present invention instructs a computer to execute: a step of displaying on a display unit a playback selection menu that prompts a user to select either head playback in which a content is reproduced from the beginning or middle playback in which the content is reproduced from the middle thereof; a step of highlighting on the display unit one of menu items contained in the playback selection menu so that the menu item will be selected; a step of reproducing the content according to the highlighted menu item contained in the playback selection menu; a step of suspending reproduction of the content; and a step of when reproduction of the content is suspended, displaying the playback selection menu on the display unit and highlighting a menu item indicating middle playback.

According to the present invention, ease of use improves. Moreover, the number of manipulations can be reduced and incorrect manipulations can be prevented.

Other and further objects, features and advantages of the invention will appear more fully from the following description.

BRIEF DESCRIPTION OF THE DRAWINGS

FIG. 6A is a plan view showing an LCD layer, which is included in the internal structure of the portable HDD motion picture playback device shown in FIG. 1, from the screen side thereof;

FIG. 6B is a plan view showing a motherboard layer and an HDD substrate layer, which are included in the internal structure of the portable HDD motion picture playback device shown in FIG. 1, from the screen sides thereof;

FIG. 6C is a plan view showing the HDD layer, which is included in the internal structure of the portable HDD motion picture playback device shown in FIG. 1, from the screen side thereof;

FIG. 6D is a plan view showing the motherboard layer, which is included in the internal structure of the portable HDD motion picture playback device shown in FIG. 1, from the side opposite to the screen side thereof;

FIG. 6E is a plan view showing the HDD substrate layer, which is included in the internal structure of the portable HDD motion picture playback device shown in FIG. 1, from the side opposite to the screen side thereof;

FIG. 10 shows a table of title information;

FIG. 11 shows the structure of an intra-picture information file;

FIG. 12 shows the structure of an MPEG-2 system stream;

FIG. 13 shows the structure of an MPEG-2 video stream;

FIG. 18 shows an example of a playback table;

FIG. 26 shows an example of a table listing positions of intra-pictures and time instants at which reproductions are suspended;

DESCRIPTION OF THE PREFERRED EMBODIMENTS

Figure 1:
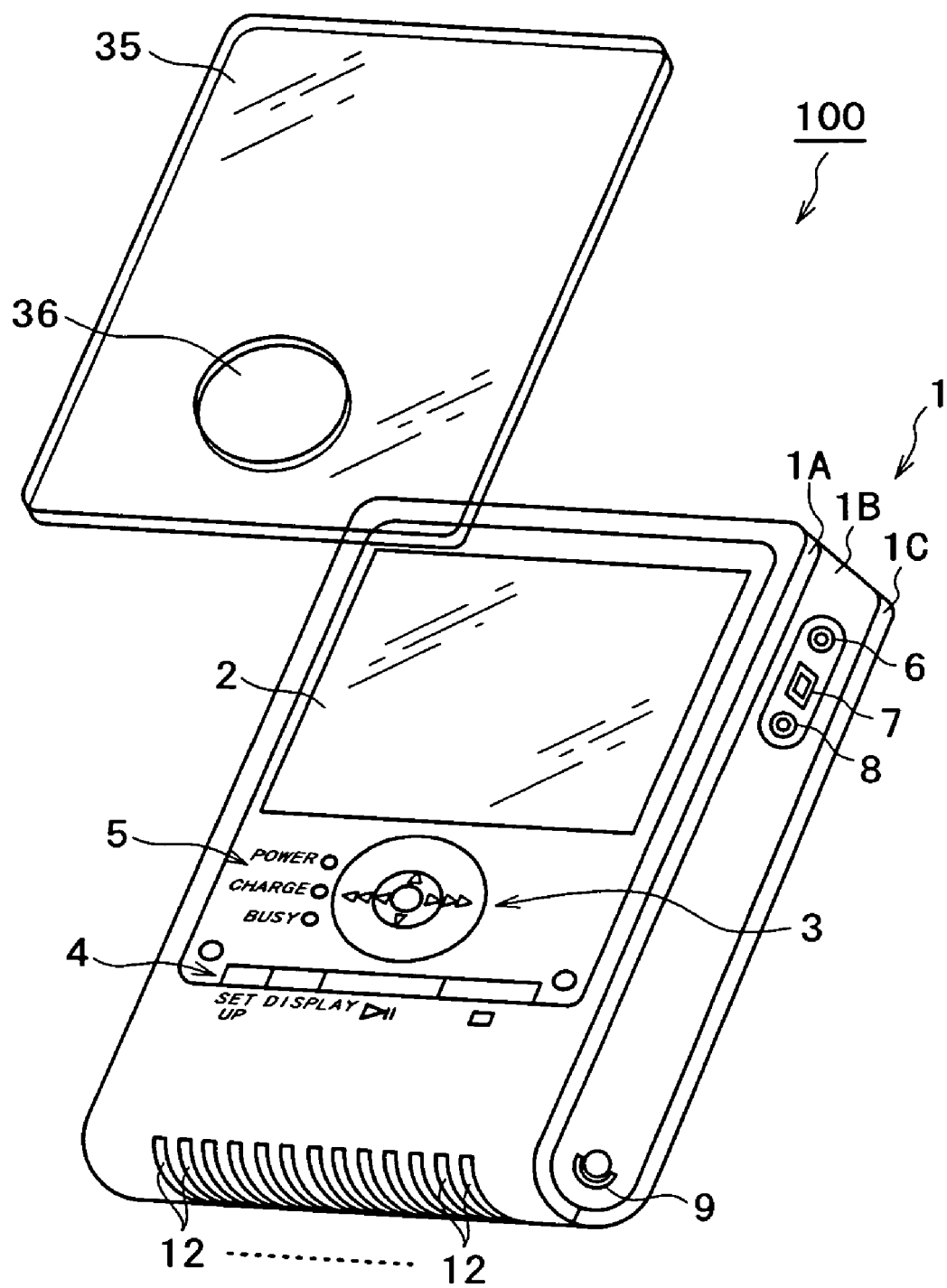
FIG. 1 is a perspective view showing the appearance of a portable HDD motion picture playback device in accordance with an embodiment of the present invention.

Referring to the drawings, an embodiment of the present invention will be described below.

Figure 2:
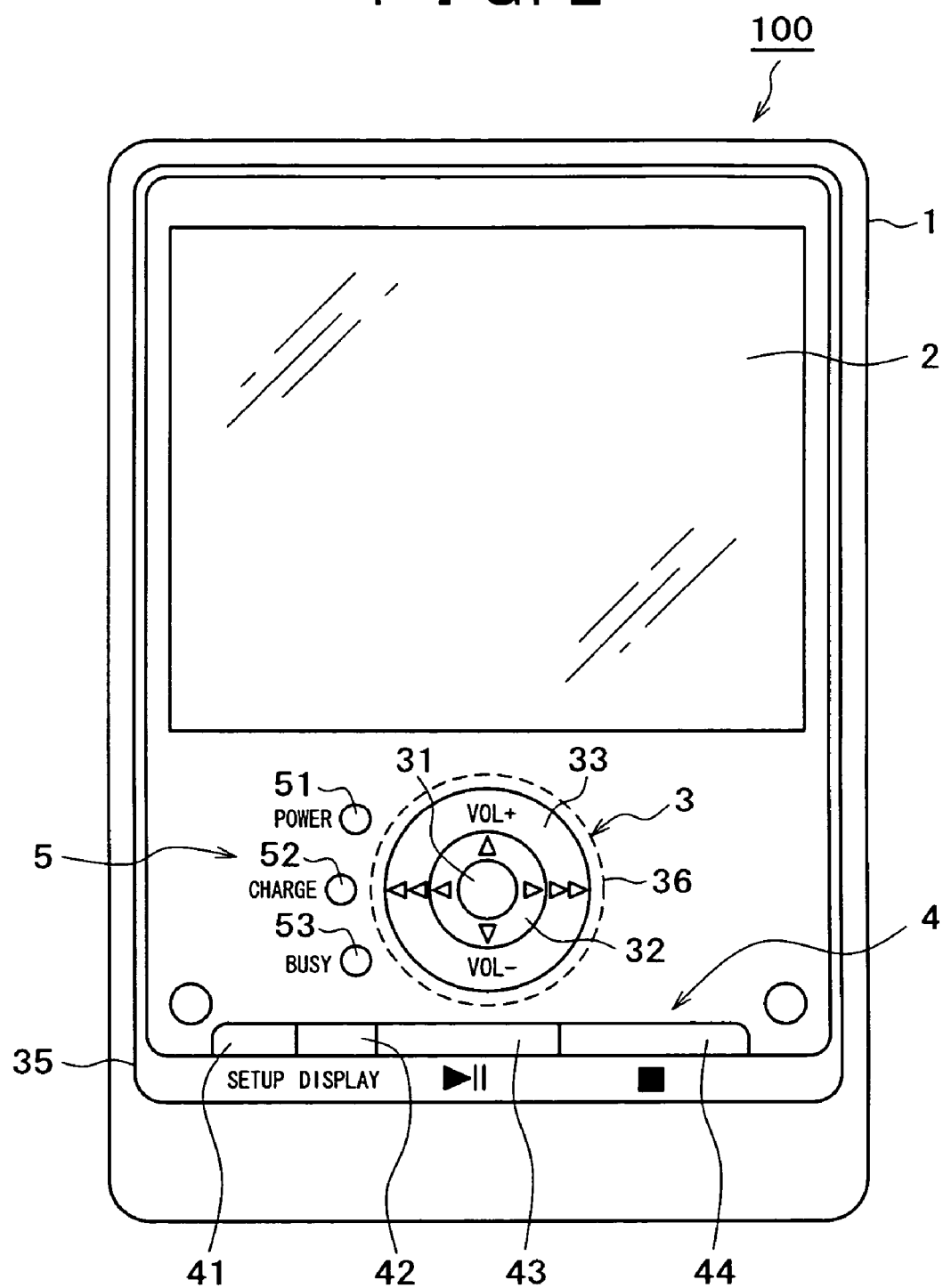
FIG. 2 is a front plan view of the portable HDD motion picture playback device shown in FIG. 1.
Figure 3:
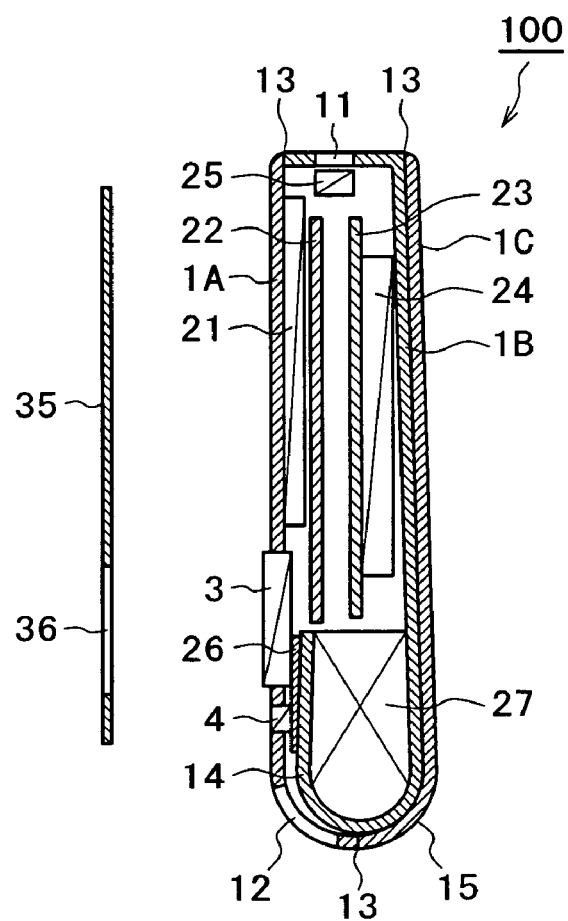
FIG. 3 is a sectional view of the portable HDD motion picture playback device shown in FIG. 1.
Figure 4:
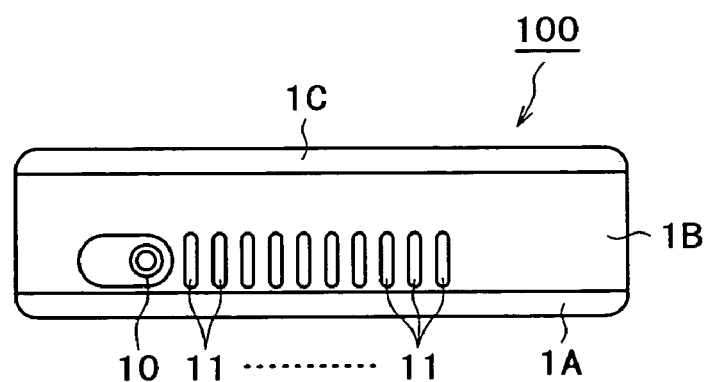
FIG. 4 is a top plan view of the portable HDD motion picture playback device shown in FIG. 1.

FIG. 1 shows a perspective view showing the appearance of a portable HDD motion picture playback device that is electronic equipment in accordance with an embodiment of the present invention. FIG. 2 is a front plan view of the portable HDD motion picture playback device. FIG. 3 is a sectional view of the portable HDD motion picture playback device. FIG. 4 is a top plan view of the portable HDD motion picture playback device.

The portable HDD motion picture playback device 100 has a casing 1 of a size permitting a user to hold the casing 1 with one hand. A liquid-crystal display (LCD) screen unit 2 serving as a display unit, a key operating unit 3, operation buttons 4, and light-emitting diode (LED) indicators 5 that indicate various states.

The key operating unit 3 comprises, as shown in FIG. 2, three keys 31, 32, and 33 that are concentric with one another and can be manipulated independently of one another. The center key is an Enter key 31 to be used to designate selection or execution. The key outside the Enter key 31 is a menu selection-related key 32 to be used to select a menu item. The key outside the menu selection-related key 32 is a playback-related key 33 to be used for reproduction.

When the menu selection-related key 32 and playback-related key 33 have any of up, down, right, and left positions thereon with the Enter key 31 as a center thereof pressed, an associated key command is produced. Key commands to be produced by the menu selection-related key 32 are commands for shifting upwards, downwards, rightwards, or leftwards a highlighted menu item so as to select a menu item contained in any of various menu screen images that will be described later. Key commands to be produced by the playback-related key 33 are commands instructing fast forward playback, rewind, or increase or decrease of a sound volume.

The operation buttons 4 include a Setup button 41 used to invoke various setting screen images, a Display button 42 used to display an elapsed (remaining) time during which a motion picture stream that is a content is reproduced, a Playback button 43 used to instruct initiation or suspension of reproduction, and a Stop button 44 used to instruct termination of reproduction.

The LED indicators 5 include a power-on indicator 51 indicating a state in which a power supply is turned on, a charge indicator 52 indicating that a buttery is being charged, and a busy indicator 53 indicating that a busy state such as transfer of a stream is under way.

A DCIN jack 6 via which a dc power supply is connected, a universal serial bus (USB) connector 7 via which the device becomes USB-compatible, and an AVOUT jack 8 via which an audio/video output is transmitted are formed in that order on one lateral side of the casing 1. Moreover, a strap eyelet 9 is formed. A Power (PWR) key (not shown) for use in turning on or off a main power supply is formed on the other lateral side of the casing 1. A headphone jack 10 and numerous slit-like vents 11 are, as shown in FIG. 4, juxtaposed on the top of the casing 1. Numerous slit-like intake ports 12 are juxtaposed on the bottom of the casing 1.

Figure 5:
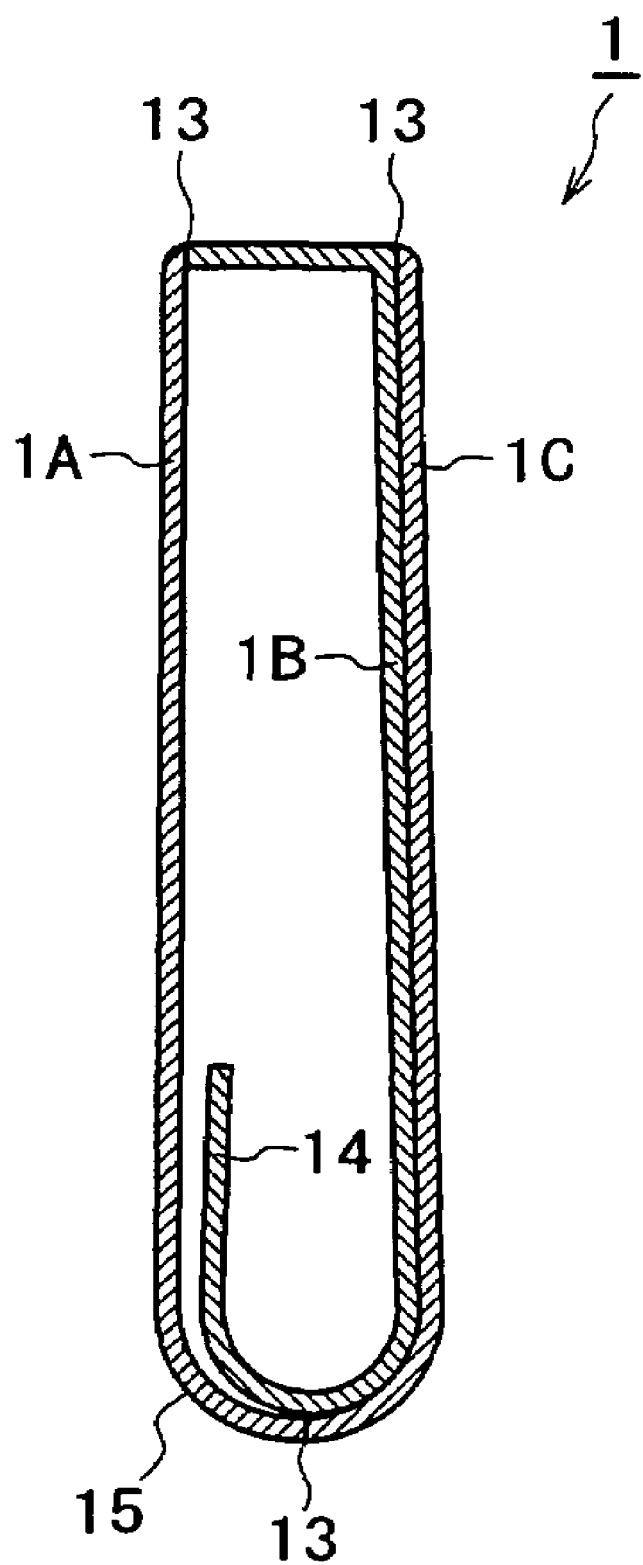
FIG. 5 shows a casing of the portable HDD motion picture playback device shown in the sectional view of FIG. 3.

FIG. 5 shows only the casing 1 shown in the sectional view of FIG. 3. As shown in FIG. 5, the casing 1 comprises a front-side casing component 1A, an intermediate casing component 1B, and a back-side casing component 1C. The front-side casing component 1A and back-side casing component 1C are casing components outlining the face and back of the portable HDD motion picture playback device 100. The intermediate casing component 1B has portions serving as the upper side and right and left sides of the portable HDD motion picture playback device 100. The portion of the casing 1 serving as the upper side has, as shown in FIG. 4, the vents 11. The front-side casing component 1A and the back-side casing component 1C are joined with the intermediate casing component 1B between them. A semicircular-section member 15 is formed as the lower part of the casing 1. The semicircular-section member 15 has the front-side casing component 1A and back-side casing component 1C directly joined. Moreover, the intake ports 12 are formed in the portion of the front-side casing component 1A serving as the front side of the semicircular-section member 15. The lower part of the intermediate casing component 1B is curved along the semicircular-section member 15 that is the lower part of the casing 1 so that it will have a U-shaped section. The lower part of the intermediate casing component 1B shall be called a curved portion 14 of the intermediate casing component 1B.

Moreover, a transparent acrylic cover 35 capable of covering the LCD screen unit 2 and operation buttons 4 can be attached to or detached from the face of the casing 1. The acrylic cover 35 protects the LCD screen unit 2 from being flawed or from adhesion of dust. The acrylic cover 35 has an opening 36 through which the key operating unit 3 is bared, so that the key operating unit 3 can be manipulated with the acrylic cover 35 attached to the casing.

Next, the internal structure of the portable HDD motion picture playback device 100 will be described below.

As shown in FIG. 3, the internal components of the casing 1 are divided in terms of locations thereof into a group of components stored in an upper part of the portable HDD motion picture playback device 100 in the height direction thereof, and a group of components stored in a lower part thereof. The group of components stored in the upper part includes an LCD 21 with a backlight, a motherboard 22, an HDD substrate 23, an HDD 24, and cooling fans 25. The group of components stored in the lower part includes a composite inverter substrate 26 and a battery pack 27. The LCD 21, motherboard 22, and HDD 24 stored in the upper part are major heat dissipation sources in the portable HDD motion picture playback device 100. When the amounts of heat dissipated from them are compared with one another, the amount of heat dissipated from the LCD 21 is larger than that from the motherboard 22, and the amount of heat dissipated from the motherboard 22 is larger than that from the HDD 24.

In the portable HDD motion picture playback device 100, the components serving as major heat dissipation sources are disposed successively from the front side to the back side in descending order of the amount of dissipated heat. Since the components are disposed this way, heating of the back-side casing component 1C can be suppressed to the greatest extent among all orders in which the components are disposed. The portable HDD motion picture playback device 100 is designed so that a user can enjoy a motion picture while holding the device with his/her hand. While the user is enjoying a motion picture, the user's hand touches the back-side casing component 1C over the widest surface. When a rise in temperature of the back-side casing component 1C can be minimized, the degree to which a user feels uncomfortable due to heat can be alleviated.

Moreover, heat dissipated from the inside of the casing 1 is released to outside owing to an air flow that is generated by the cooling fans 25 disposed uppermost in the casing 1 and circulated from the intake ports 12 formed on the bottom of the casing 1 to the vents 11 formed on the top of the casing 1 as shown in FIG. 4. Consequently, the heat dissipation sources in the casing 1 are effectively cooled. The problem of heat to be conveyed to a user is further alleviated.

The battery pack 27 serving as a power supply is disposed while being enclosed in the U-shaped curved portion 14 of the intermediate casing component 1B. Moreover, the composite inverter substrate 26 is borne by the front side (screen side) of a flat surface of the curved portion 14 formed at a distal end thereof. In other words, the battery pack 27 and composite inverter substrate 26 are separated from each other by the curved portion 14 of the intermediate casing component 1B. What is referred to as the composite inverter substrate 26 is a substrate on which parts relating to the movements of the operation buttons 4 and key operating unit 3, and an inverter for driving the backlight of the LCD 21 are mounted. Since the battery pack 27 and composite inverter substrate 26 are separated from each other by the curved portion 14 of the intermediate casing component 1B, an adverse effect of liquid leakage from the battery pack 27 on the composite inverter substrate 26 can be avoided. Moreover, direct imposition of a pressure exerted in manipulating the key operating unit 3 on the battery pack 27 can be avoided in order to protect the battery pack 27.

The battery pack 27 is not a critical heat source. Therefore, even if the battery pack 27 is disposed on the lower part of the back of the casing that will come into close contact with a user's hand, no problem occurs. Moreover, since the specific brevity of the battery pack 27 is the highest among those of the components in the casing 1 and the weight thereof is large, when the battery pack 27 is disposed in the lowest part of the casing 1, a user can hold the portable HDD motion picture playback device 100 with a sense of stability while enjoying a motion picture.

FIG. 6A to FIG. 6E are plan views showing the internal structure of the portable HDD motion picture playback device 100 layer by layer. The backlight of the LCD 21 is connected to a connector 132 fixed on the screen side of the composite inverter substrate 26 over connection wiring 131. Signals required for lighting and controlling the backlight are transmitted from the composite inverter substrate 26 to the backlight of the LCD 21 over the connection wiring 131. Moreover, the LCD 21 is connected to a connector 134 fixed to the side of the motherboard 22 opposite to the screen side thereof over connection wiring 133. Signals required for the LCD 21 are transmitted from the motherboard 22 over the connection wiring 133. The motherboard 22 and composite inverter substrate 26 are electrically connected to each other via the connectors 135 and 136, which are fixed to the screen sides thereof, over connection wiring 137 linking the connectors 135 and 136. The motherboard 22 and composite inverter substrate 26 communicate mutually necessary signals to each other. Two connectors 140 and 141 to which one ends of connection wirings 138 and 139 over which driving signals are transmitted to the two cooling fans 25 are formed on the screen side of the motherboard 22. The motherboard 22 and HDD substrate 23 can communicate with each other over connection wiring 144 linking a connector 142 formed on the side of the motherboard 22 opposite to the screen side thereof and a connector 143 formed on the screen side of the HDD substrate 23. The motherboard 22 has the DCIN jack 6, the USB connector 7, the AVOUT jack 8 via which an audio/video output is transferred, and the headphone jack 145. The HDD substrate 23 has a switch 145 for use in resetting the system. Connection wiring 146 led out of the battery pack 27 is routed to a connector 147 formed on the screen side of the motherboard 22. The HDD 24 is electrically connected to the HDD substrate 23 via a connector 148 formed on the side of the HDD substrate 23 opposite to the screen side thereof.

Figure 7:
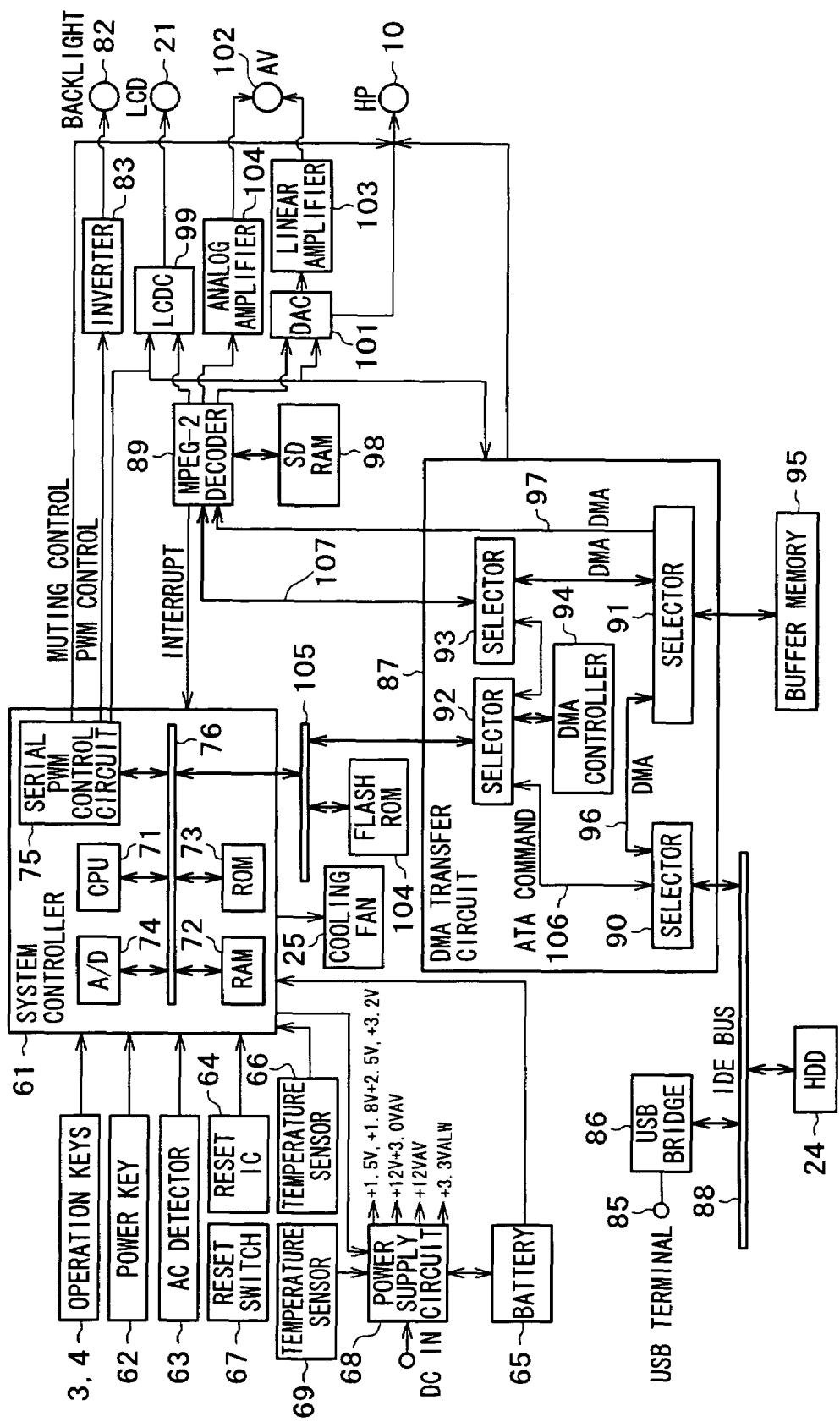
FIG. 7 shows the configuration of circuits mounted on the motherboard.
Figure 8:
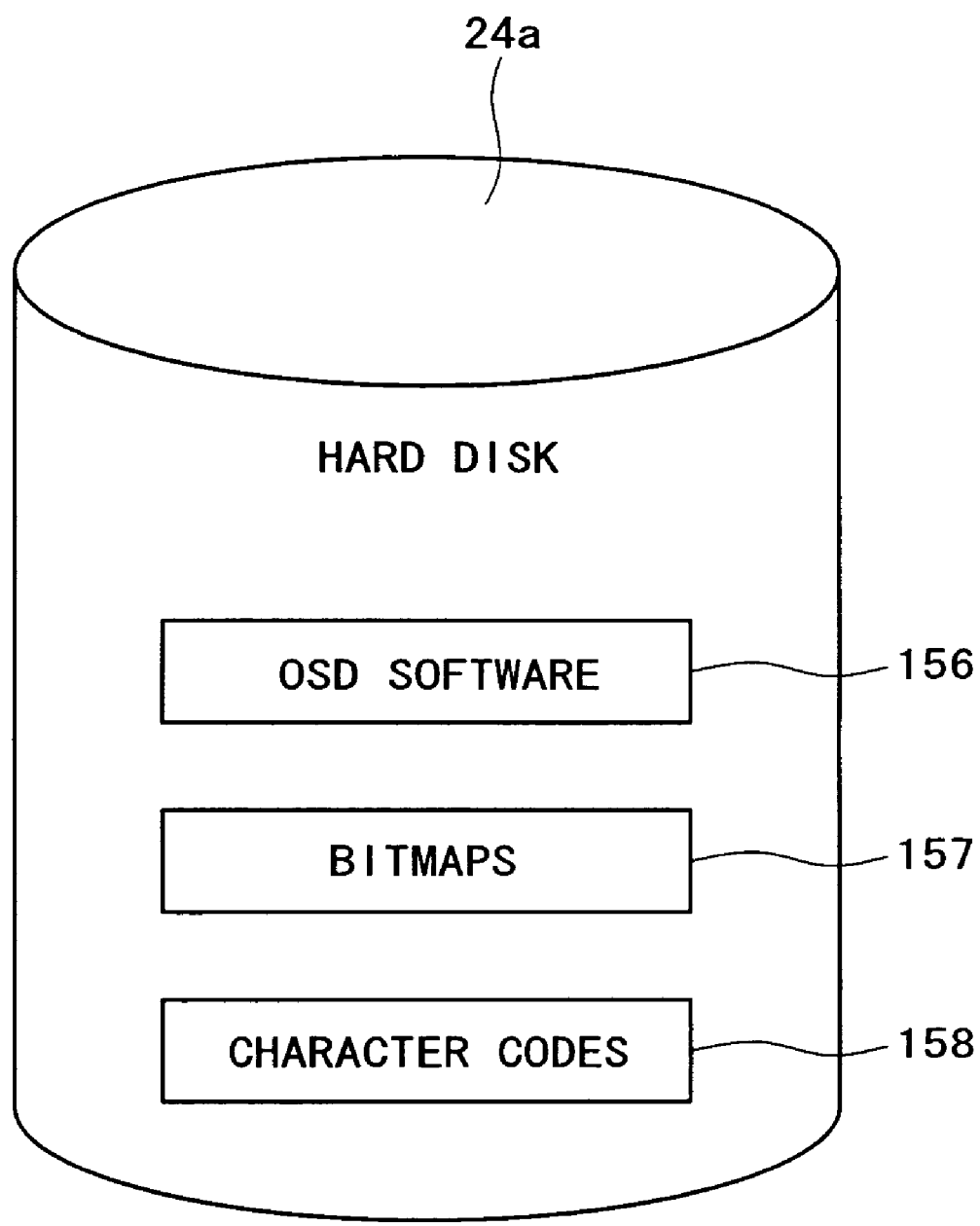
FIG. 8 is a conceptual diagram showing data and others stored in a hard disk.

Next, the electrical configuration of the portable HDD motion picture playback device 100 will be described in conjunction with FIG. 7. FIG. 7 shows mainly the configuration of circuits mounted on the motherboard 22.

In the drawing, a system controller 61 monitors the movements of the key operating unit 3 and operation buttons 4, the movement of the Power key 62, the connection of an alternating-current power supply (detection of an alternating current) 63, an output of a reset IC 64, a voltage at the battery 65, and an output of a temperature sensor 66. The system controller 61 executes processing according to the result of the monitoring. The reset IC 64 is an IC that generates a reset signal when a reset switch 67 is manipulated.

When the system controller 61 senses that the Power key 62 is pressed, power is supplied from the battery 65 to the system by a power supply circuit 68. Consequently, the system is started and various circuit elements are initialized so that they can act. Moreover, the system controller 61 controls so that the power-on indicator 51 will be lit. If the system controller 61 senses that the Power key 62 is pressed while the system is in operation, the system controller 61 terminates the system and the power supply circuit 68 discontinues power supply to the system.

In response to a reset signal from the reset IC 64, the system controller 61 resets, that is, terminates the system and then restarts the system.

The system controller 61 controls the power supply circuit 68 when sensing the connection of the ac power supply 63 (detection of an alternating current), and then controls charging of the battery 65. Based on an output of the temperature sensor 69 disposed near the power supply circuit 68, for example, when a high temperature equal to or higher than a set temperature is detected, the power supply circuit 68 is automatically turned off.

The system controller 61 calculates a remaining battery capacity of the battery 65 according to the result of monitoring the voltage at the battery, and controls the indication of the remaining battery capacity on the screen.

The system controller 61 controls the revolving speed of the cooling fans 25 according to the output of the temperature sensor 66. In other words, the system controller 61 extends control so as to raise a cooling ability proportionally to a rise in temperature.

Moreover, the system controller 61 monitors the movements of the key operating unit 3 and operation buttons 4 so as to handle an event associated with the kind of key manipulated.

The system controller 61 comprises a central processing unit (CPU) 71, a random access memory (RAM) 72, a read-only memory (ROM) 73, an A/D conversion circuit 74, and a serial pulse width modulation (PWM) control circuit 75 that are interconnected over a bus 76. The CPU 71 uses the RAM 72 as a work area to perform various kinds of arithmetic and logic operations according to firmware stored in the ROM 73. Stored as the firmware in the ROM 73 are, for example, a program for starting up the system, and a program for activating checksum at the time of startup. The A/D conversion circuit 74 converts an analog value, which represents the result of monitoring the movements of the key operating unit 3 and operation buttons, the movement of the Power key 62, the connection of an ac power supply (detection of an alternating current) 63, an output of the reset IC 64, the voltage at the battery 65, and the output of the temperature sensor 66, into a digital value. The serial PWM control circuit 75 transfers a PWM signal, with which muting for the headphone 81 or the luminance of a backlight 82 of the LCD 21 is controlled, to an inverter 83.

A USB bridge 86 to which a USB terminal 85 is connected, the HDD 24, and a direct memory access (DMA) transfer circuit 87 are interconnected over an integrated drive electronics (IDE) bus 88. Data including a motion picture stream transferred from a personal computer (PC) that is not shown and plugged into the USB terminal 85 is stored in the HDD 24 via the USB bridge 86 over the IDE bus 88.

The DMA transfer circuit 87 is a circuit for transferring data read from the HDD 24 to a Moving Picture Coding Experts Group (MPEG)-2 decoder 89. The DMA transfer circuit 87 includes four selectors 90, 91, 92, and 93 and a DMA controller 94. The first selector 90 is a selector for selecting data on the IDE bus 88. In response to an AT Attachment (ATA) command used to access the HDD 24, the system controller 61 connects the DMA transfer circuit 87 onto the IDE bus 88. The first selector 90 is connected to the second selector 91 connected to a buffer memory 95 over a first DMA transmission line 96. Consequently, data sampled from the IDE bus 88 by the first selector 90 is transferred to the buffer memory 95 via the second selector 91 over the first DMA transmission line 96.

During data transfer from the HDD 24 to the buffer memory 95, the system controller 61 controls the timing of issuing an ATA command to the first selector 90 so that data will be intermittently read from the HDD 24. Specifically, for example, the system controller 61 issues an ATA command to the first selector 90 so that: data will be read from the HDD 24 in units of a motion picture stream that covers a predetermined reproduction time, and transferred to the buffer memory 95; and when the buffer memory 95 runs out of data, a motion picture stream for covering the next reproduction time will be read from the HDD 24. Consequently, the HDD 24 is intermittently accessed, and the amount of heat dissipated from the HDD 24 and power consumed by the HDD 24 can be minimized.

Data including a motion picture stored in the buffer memory 95 is read by the second selector 91 when a motion picture stream covering a predetermined reproduction time is stored in the buffer memory 95. The read data is transferred to the MPEG-2 decoder 89 over a second DMA transfer line 97 linking the second selector 91 and MPEG-2 decoder 89. The MPEG-2 decoder 89 is a circuit for decoding by hardware a motion picture stream encoded based on the MPEG-2 standard. An SDRAM 98 is a randomly accessible memory that is used as a work area by the MPEG-2 decoder 89.

Motion picture data contained in an output of the MPEG-2 decoder 89 is transferred to an LCD controller 99. The LCD controller 99 controls drive of the LCD 21, whereby a motion picture is reproduced. On the other hand, audio data sent from the MPEG-2 decoder 89 is converted into an analog signal by a D/A converter 101, and then transferred to a headphone plugged into the headphone terminal 10. Moreover, an external television or the like can be plugged into the AVOUT terminal 102. When the external television is plugged into the AVOUT terminal 102, an analog signal sent from the D/A converter 101 is amplified to a required level by a linear amplifier 103.

The third selector 92 included in the DMA transfer circuit 87 communicates with a bus 105 over which the system controller 61 and a flash ROM 104 are interconnected. The third selector 92 samples an ATA command, which is issued from the system controller 61, from the bus 105, and notifies the first selector 90 over a control line 106 of the fact that the ATA command is sampled.

In the flash ROM 104, data relevant to setting screen images to be displayed on the screen unit 2, data of fonts and images concerning on-screen display (OSD), microcodes implemented in the MPEG-2 decoder 89 and DMA transfer circuit 87, and backup data of the microcodes are stored as read-only data. What is referred to as the data relevant to setting screen images is data representing default values of a tone, a contract, and others of the screen unit 2.

As the read-only data, OSD software 156 for implementing on-screen display, and data including bitmaps 157 and character codes 158 that are the fundamentals of a title list, a menu, and setting screen images are stored in a hard disk 24a included in the HDD 24. The OSD software is software for displaying on the screen unit 2, for example, a playback mark, a suspension mark, a volume mark, a highlighted field, and other marks.

When the system controller 61 reads the bitmap 157 and character code 158 from the HDD 24, the system controller 61 notifies the DMA controller 94 via the third selector 92 of the fact. In response to the notification, the DMA controller 94 validates the first DMA transmission line 96 linking the third selector 92 and second selector 91. Moreover, the DMA controller 94 controls the fourth selector 93 to validate the third DMA transmission line 107 linking the second selector 91 and MPEG-2 decoder 89.

The character code read from the HDD 24 and held together with the bitmap in the buffer memory 95 is transferred to the system controller 61 via the second and third selectors 91 and 92 over the bus 105. The system controller 61 reads the bitmap associated with the character code 158 from the flash ROM 104, and returns it to the third selector 92. The DMA controller 94 transfers the bitmap associated with the character code returned from the system controller 61 to the fourth selector 93 via the third selector 92. The bitmap is synthesized with the bitmap read from the buffer memory 95 via the second selector 91, and then transferred to the MPEG-2 decoder 89.

The third DMA transmission line 107 has a larger bus width than the second DMA transmission line 97 because the third DMA transmission line 107 is used to transmit a bitmap. For example, the second DMA transmission line 97 comprises eight data lines and four control lines, while the third DMA transmission line 107 comprises sixteen data lines, twenty-four address lines, and three control lines. This is intended not to cause a large difference in a user-sensible speed between reproduction of a motion picture stream and reproduction of a bitmap.

Next, a transfer application to be adapted to a PC for the purpose of utilizing the portable HDD motion picture playback device 100 will be described below.

Figure 9:
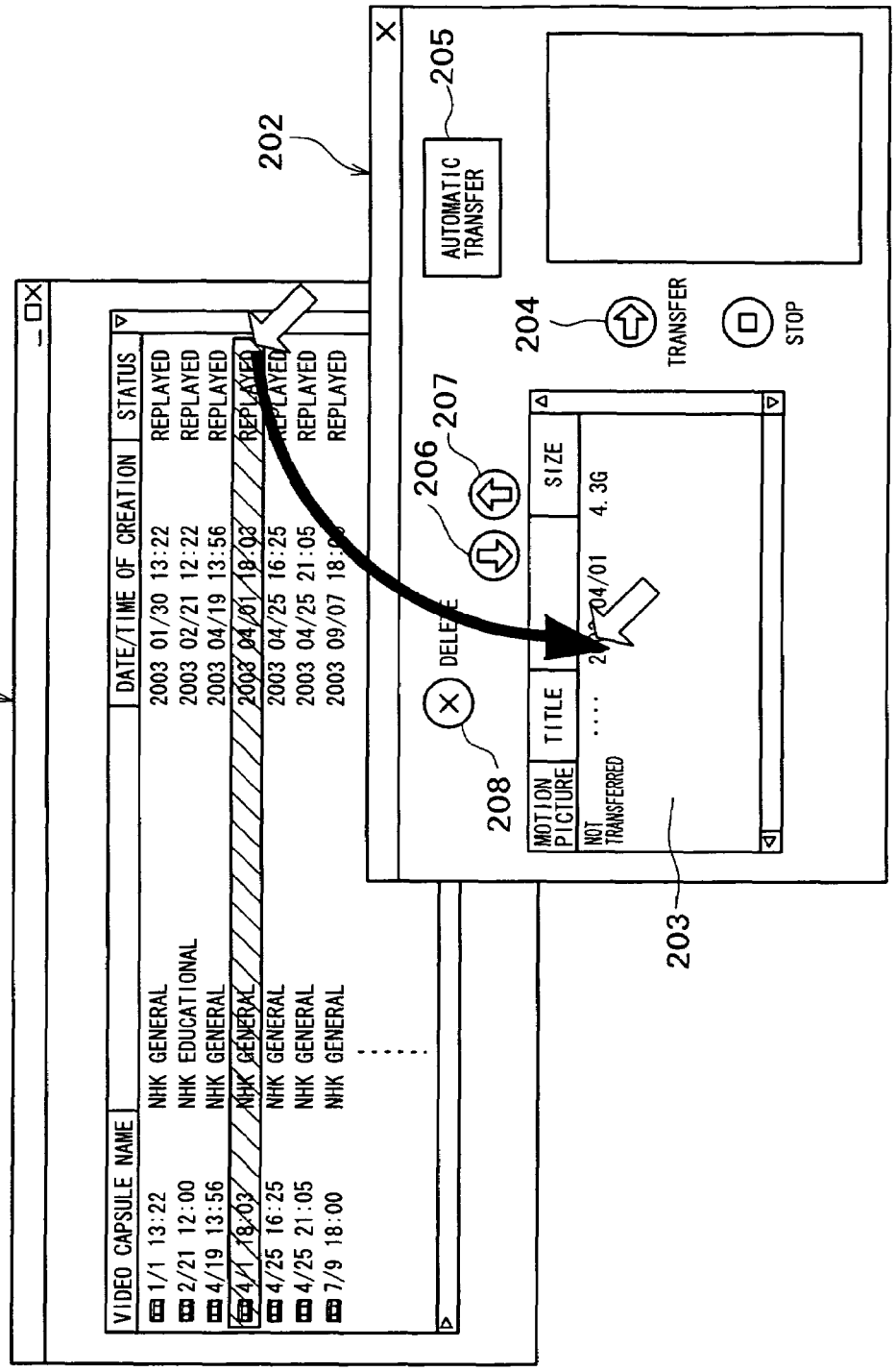
FIG. 9 shows a display window listing contents to be recorded video and a transfer window which are opened on a personal computer by a transfer application.

FIG. 9 shows a display window 201 that lists contents to be recorded as video and that is displayed on a PC by the transfer application. The contents display window 201 presents a list of titles of motion picture streams that have been recorded in the PC or reserved for recording, dates of creation of the motion picture streams, and states thereof signifying whether the motion picture streams have already been recorded. The pieces of information are presented successively, for example, from up to down in order of their being recorded or reserved for recording.

When a desired motion picture stream must be transferred to the portable HDD motion picture playback device 100, a transfer window 202 is invoked. A desired motion stream listed in the video-recordable contents display window 201 is dropped into a listing box 203, in which transferred motion picture streams are listed, within the transfer window 202 by performing drag-and-drop or the like using a mouse. Consequently, information on the motion picture stream is displayed in the listing box 203 in which transferred motion picture streams are listed. Thereafter, a Transfer button 204 within the transfer window 202 is designated by clicking a mouse button. If the portable HDD motion picture playback device 100 is connected to a PC, transfer of the motion picture stream from the PC to the portable HDD motion picture playback device 100 is initiated immediately. When the Transfer button 204 is designated by clicking the mouse button, if the portable HDD motion picture playback device 100 is not connected to the PC, as soon as the portable HDD motion picture playback device 100 is connected to the PC, transfer of the motion picture stream is initiated.

Various formats including Audio Video Interleaved (AVI) and Windows® Media Video are known as file formats for motion picture streams to be stored in a PC. The portable HDD motion picture playback device 100 has specifications therefor defined so that motion picture streams formatted according to the MPEG-2 standard can be decoded and reproduced. Before transferring a motion picture stream from a PC to the portable HDD motion picture playback device 100, the transfer application autonomously converts the format of the motion picture stream to an MPEG-2-conformable format, and transfers the motion picture stream, which has been converted to be conformable to the MPEG-2 standard, from the PC to the portable HDD motion picture playback device 100.

The actions to be performed in a case where a user manually transfers a desired motion picture stream have been described. Since some of contents that are motion pictures have lengths of several gigabytes, a considerable time is presumably required for data transfer. For this reason, the transfer application has a transfer reservation feature. In order to employ the transfer reservation feature, an Auto Transfer button 205 within the transfer window 202 is designated by clicking the mouse button. A window for use in designating a time instant at which automatic transfer is initiated is then opened. A user enters a desired transfer start time instant and finalizes the entry. The transfer application preserves the user-designated transfer start time instant, and compares the time instant with a time instant indicated by a clock. When the designated time instant comes, the motion picture streams displayed in the listing box 203, in which transferred motion picture streams are listed, within the transfer window 202 are transferred one by one from the PC to the portable HDD motion picture playback device 100 after their formats are converted.

The motion picture streams displayed in the listing box 203, in which transferred motion picture streams are listed, within the transfer window 202 are transferred orderly from the uppermost one. The display order of motion picture streams can be freely changed by clicking the mouse button within Change Rank buttons 206 and 207. Namely, after a motion picture stream whose rank should be changed is selected by clicking the mouse button, the mouse button is clicked once within the Change Rank button 207. Consequently, the selected motion picture stream ranks one step higher. On the contrary, when the mouse button is clicked once within the Change Rank button 206, the selected motion picture stream ranks one step lower. After a motion picture stream to be deleted is selected by clicking the mouse button, if a Delete button 208 is clicked, the selected motion picture stream is deleted from the listing box 203, in which transferred motion picture streams are listed, and excluded from objects of transfer.

A PC also transfers a table of title information 217, which lists, as shown in FIG. 10, pieces of information on motion picture streams, to the portable HDD motion picture playback device 100. The title information 217 contains, for example, a title list or titles, dates of creation on which motion pictures are created, recording times, channel names, pieces of counter information, and other data such as amounts of data or deletion preventing flags, though other data is not shown in FIG. 10. The portable HDD motion picture playback device 100 preserves a received title list in the HDD 24.

Next, the contents of data concerning a motion picture stream to be stored in the HDD 24 included in the portable HDD motion picture playback device 100 will be described below.

FIG. 11 shows the structure of an intra-picture information file used to arrange data items constituting a motion picture stream.

An intra-picture information file 111 is also stored in the HDD 24 included in the portable HDD motion picture playback device 100. The intra-picture information file 111 is created for every intra-picture or intra-pictures whose duration corresponds to a time interval required for trick playback, for example, fast-forward playback at a 15-fold speed or a 60-fold speed or rewind. The portable HDD motion picture playback device 100 reproduces, for example, two intra-pictures per sec.

The intra-picture information file 111 contains information 112 representing a real address of an intra-picture in the HDD 24, a time stamp 113 important for a counter means, and audio output mode information 114. The information 112 representing the real address of an intra-picture in the HDD 24 comprises a sector ID number that indicates an intra-picture recording start position and an offset from the leading position of the sector as well as a sector ID number that indicates an intra-picture recording end position and an offset from the leading position of the sector. An amount of data representing one intra-picture is larger than an amount of data recordable in one sector (for example, 512 bytes). The intra-picture recording start position and recording end position are therefore deviated from the leading positions of sectors by the offsets. The time stamp 113 is time instant data contained in video, and stored in the form of hour/min/sec for each intra-picture. In one motion picture stream, the time instant of the first intra-picture is 0:00:00. The audio output mode information 114 is information defining whether audio data is transmitted as stereo data or monaural data.

For transfer of an MPEG-2-conformable stream to the portable HDD motion picture playback device 100, the transfer application to be adapted to a PC creates the intra-picture information file 111. The transfer application autonomously transfers, as mentioned above, a motion picture stream to the portable HDD motion picture playback device 100. At this time, the created intra-picture information file is also transferred to the HDD 24 included in the portable HDD motion picture playback device 100. Based on the intra-picture information file 111, the portable HDD motion picture playback device 100 can reproduce the motion picture stream as described later.

Figure 14:
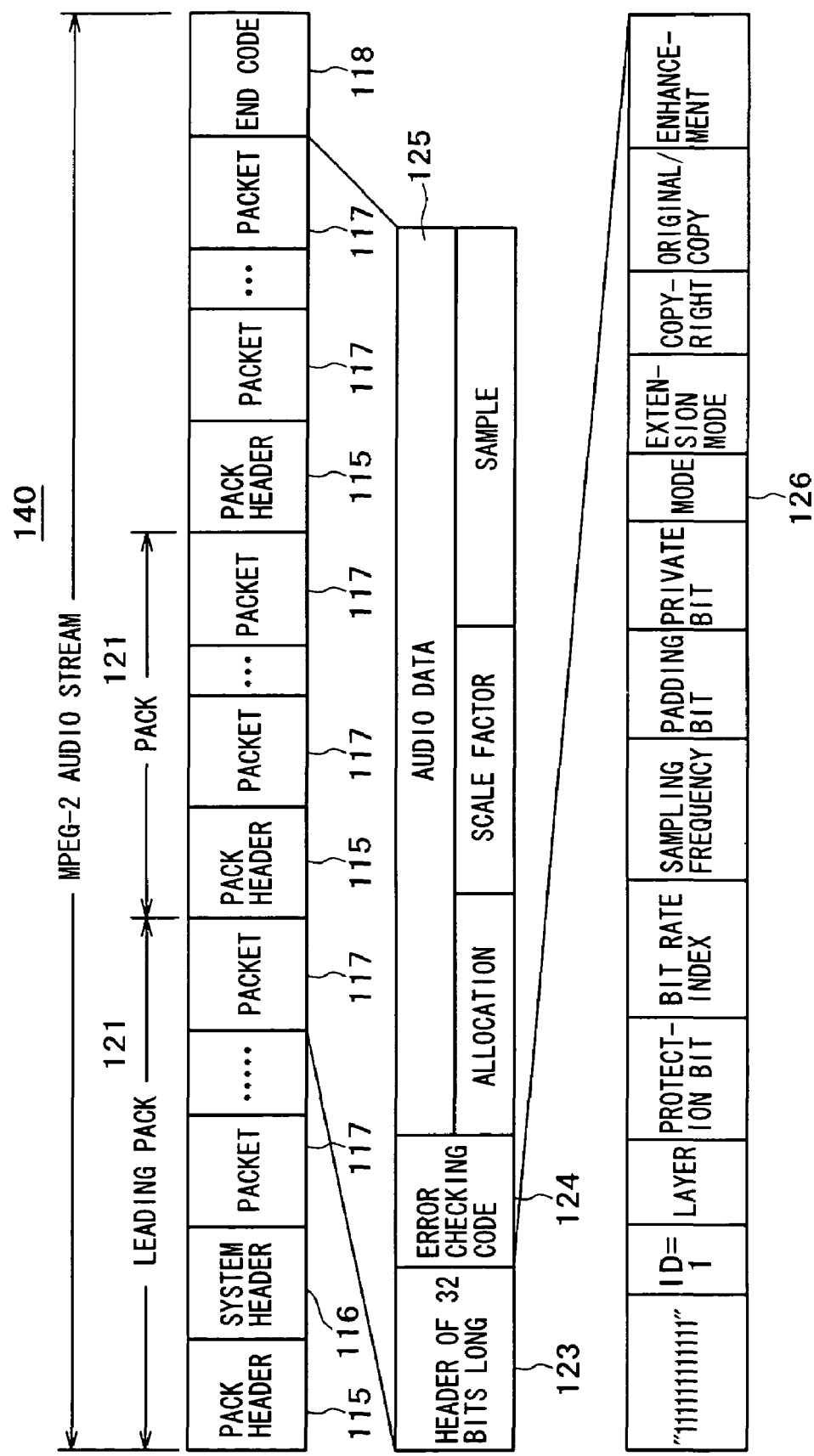
FIG. 14 shows the structure of an MPEG-2 audio stream.

FIG. 12 shows the structure of an MPEG-2 system stream 120. FIG. 13 shows the structure of an MPEG-2 video stream. FIG. 14 shows the structure of an MPEG-2 audio stream 140. The streams 120, 130, and 140 will be generically referred to as MPEG-2-conformable streams or MPEG-2 streams.

As shown in FIG. 12 to FIG. 14, each of the MPEG-2 streams 120, 130, and 140 comprises a plurality of packs 121. The leading pack 121 comprises a pack header 115, a system header 116, and a trailing group of packets 117. Each of subsequent packs 121 comprises a pack header 115 and a trailing group of packets 117. An end code 118 is inserted to the last position in the last pack. The pack header 115 contains, as shown in FIG. 12, a pack start code, "01," a sustainable cell rate (SCR), a multiplexing rate, and a stuffing byte. The system header 116 contains a system header start code, a header length, a bit rate, the number of audio channels, four flags, the number of video channels, a reserved byte, and N-loop (n pieces of information) individual stream information. The four flags include a fixed flag, a CPS flag, an audio lock flag, a video lock flag, and a "1" marker bit. The N-loop individual stream information contains a stream ID number, "11," a buffer area scale, and a buffer area size.

As shown in FIG. 13, a video packet 117 comprises a sequence header (SH) 119 and a trailing group of pictures (GOP) 122. The GOP 122 comprises a plurality of pictures of three kinds, that is, intra-pictures (I picture), predictive-pictures (P pictures), and bi-directionally predictive-pictures (B pictures). An intra-picture is adopted as a leading picture of the GOP 122. The intra-picture is represented by compressed screen image data containing own screen image information alone (intra-frame compression). The predictive-picture is represented by screen image data containing information on a correlation to a temporally past screen image (inter-frame compression). The bi-directionally predictive-picture is represented by screen image data containing information on correlations to temporally preceding and succeeding screen images (inter-frame compression). Consequently, the intra-picture can be said to be decoded or reproduced solely as it is. On the other hand, as shown in FIG. 14, an audio packet 117 comprises a header 123, an error checking code 124, and audio data 125. The header 123 contains a bit 126 representing an output mode of audio data (stereo mode or monaural mode). Incidentally, the number of frames used as intra-pictures included in, for example, one GOP 122 is about fifteen.

As a typical file system adopted for recording media including an HDD, a file system based on a File Allocation Table (FAT) is known. The portable HDD motion picture playback device 100 in accordance with the present embodiment also adopts the FAT file system.

Figure 15:
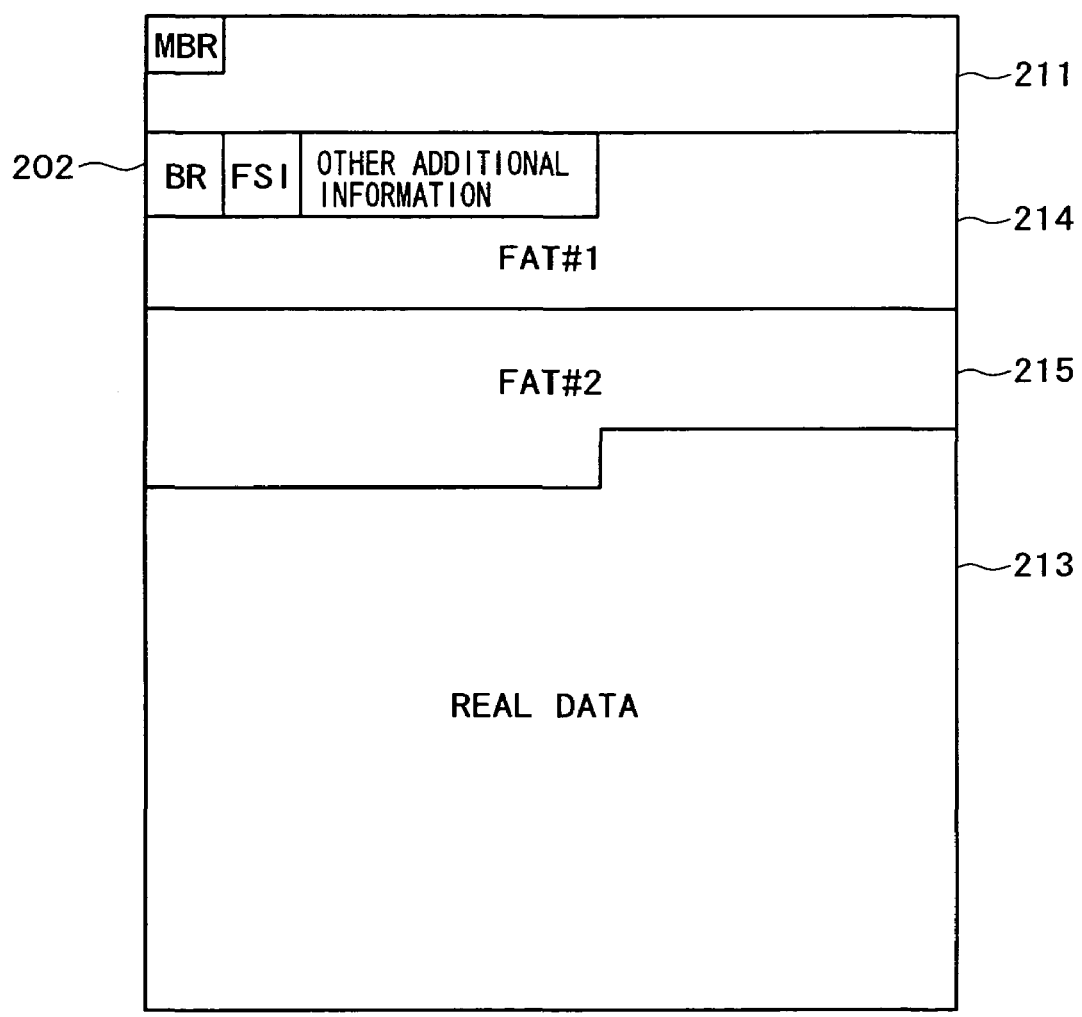
FIG. 15 shows the structure of a storage area in an HDD to which a FAT file system is adapted.
Figure 16:
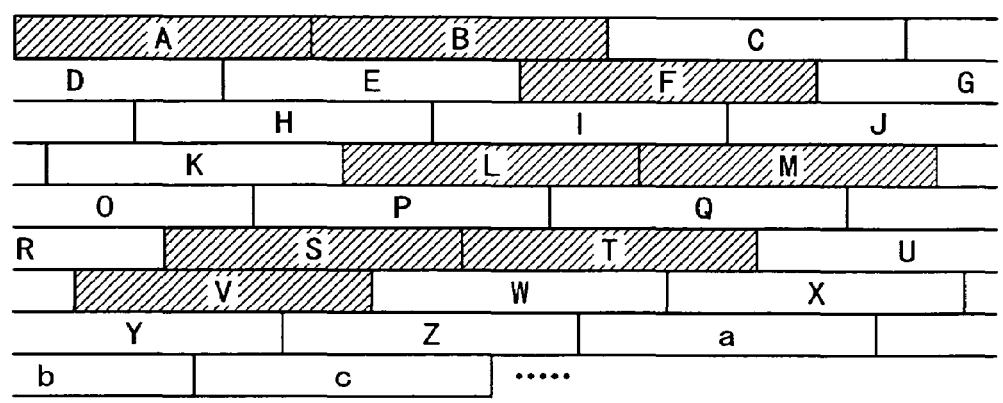
FIG. 16 shows positions in a live data area in the HDD at which file data is recorded.
Figure 17:
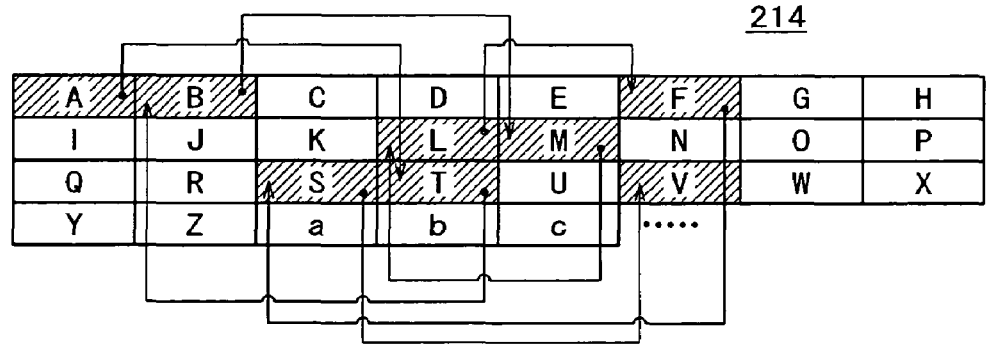
FIG. 17 shows an example of a FAT management table.

FIG. 15 shows the structure of a storage area in an HDD for which the FAT file system is adopted. The storage area in an HDD comprises: a leading area 211 in which a master boot record (MBR) or the like is recorded; an area 212 in which a boot record (BR) allocated to the leading position and information on a file system (FSI) are recorded; an area 213 in which live data of a file is recorded; and areas 214 and 215 in which a plurality of FAT management tables FAT1 and FAT2 are recorded. The FAT management table FAT2 is a backup of the FAT management table FAT1. As far as randomly accessible recording media including an HDD are concerned, an available area is gradually dispersed along with repetition of reading or writing of data. The live data contained in one file is not always written in successive clusters but is rather dispersedly written. For example, as shown in FIG. 16, even when a group of successive clusters (A, B, etc., Y, Z, a, b, c, etc.) is available, the live data contained in one file may be recorded in clusters A, T, B, M, L, F, S, V, etc. in that order. According to the FAT file system, for example, as shown in FIG. 17, the FAT management tables FAT1 and FAT2 are used to manage numbers assigned to clusters, in which the live data of one file is written, together with the order of the clusters. An operating system (OS) references the FAT management table FAT1 or FAT2 to read the live data of an intended file.

As mentioned above, a motion picture steam formatted according to the MPEG-2 standard is recorded in an HDD for which the FAT file system is adopted. The motion picture stream is read from the HDD and reproduced. The reproduction will be described below. Namely, as shown in FIG. 18, a playback table 210 in which cluster numbers assigned to clusters in which a motion picture stream to be reproduced is recorded are registered in order that live data is read from the clusters is created in a main memory. Thereafter, the cluster numbers are read from the playback table 210 orderly from the leading cluster number. The live data is then read from the HDD and decoded, whereby the motion picture stream is reproduced.

Figures 19, 20:
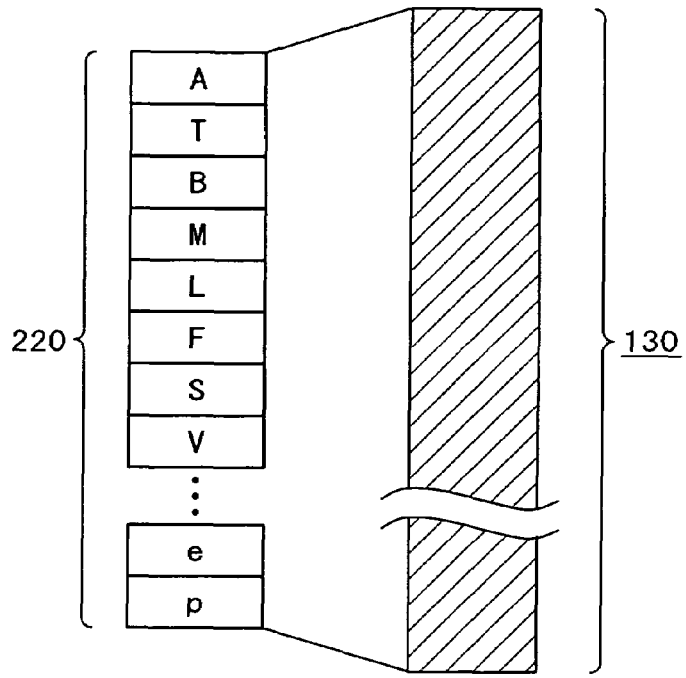
FIG. 19 shows correspondence of successive clusters listed in the playback table with a motion picture stream.
FIG. 20 shows an example of a table listing playback table ID numbers and I-picture information file ID numbers.

FIG. 19 shows the correspondence of successive clusters (A, T, B, etc., e, p) 220, of which numbers are entered in the playback table 210 shown in FIG. 18, with a motion picture stream 130 shown in FIG. 13. Namely, the motion picture stream 130 is recorded in the group of successive clusters 220 in the hard disk.

FIG. 20 shows a table in which a title of a motion picture stream is associated with an ID number with which the playback table 210 is identified and an ID number with which the intra-picture information file 111 is identified. The system controller 61 produces ID numbers, with which the playback table 210 and intra-picture information file 111 are identified, during transfer of a motion picture stream from a PC. The system controller 61 then creates a table 175 and stores it in the HDD 24. Alternatively, the ID numbers of the playback tables 210 and the ID numbers of the intra-picture information files 111 that are listed in the table 175 may be managed all together using the table of the title information 217.

Next, actions to be performed in the portable HDD motion picture playback device 100 having the foregoing configuration will be described below.

Figure 21:
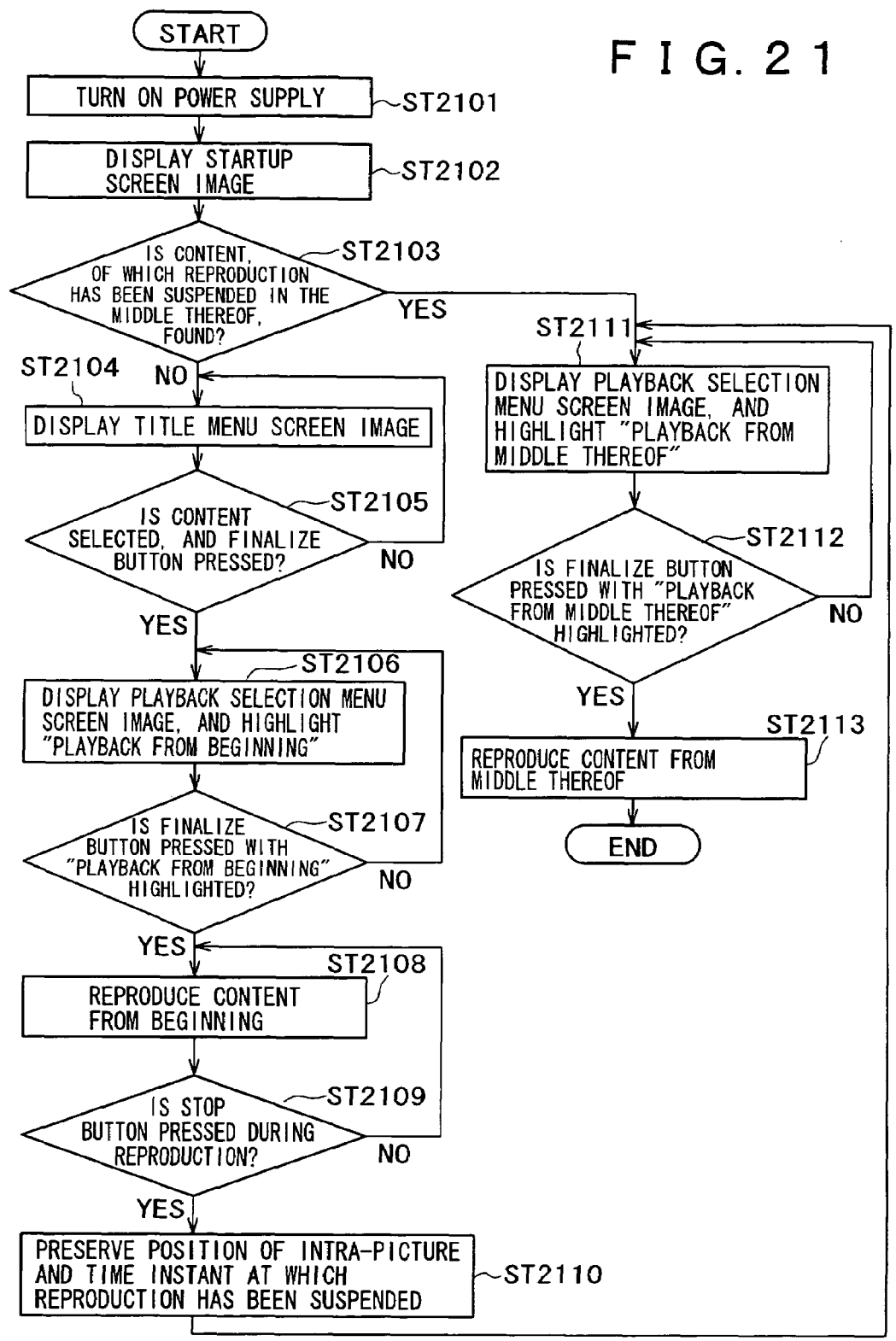
FIG. 21 is a flowchart describing reproduction of a motion picture stream.

FIG. 21 is a flowchart describing reproduction of a motion picture stream. First, when a user presses the Power key 62, the power supply circuit 68 supplies power to the system (step 2101). The system controller 61 samples a required program from the ROM 73, deploys it in the RAM 72, and displays a startup screen image on the screen unit 2 during system startup (step 2102). The system controller 61 reads the FAT management table, title information 217 (see FIG. 10), bitmaps 157 relevant to a list of titles of motion picture streams specified in the title information 217, and OSD software 156 from the HDD 24 to the buffer memory 95. The system controller 61 reads the table 210 shown in FIG. 18 as the FAT management table, and also reads the table 175 shown in FIG. 20.

Figure 23:
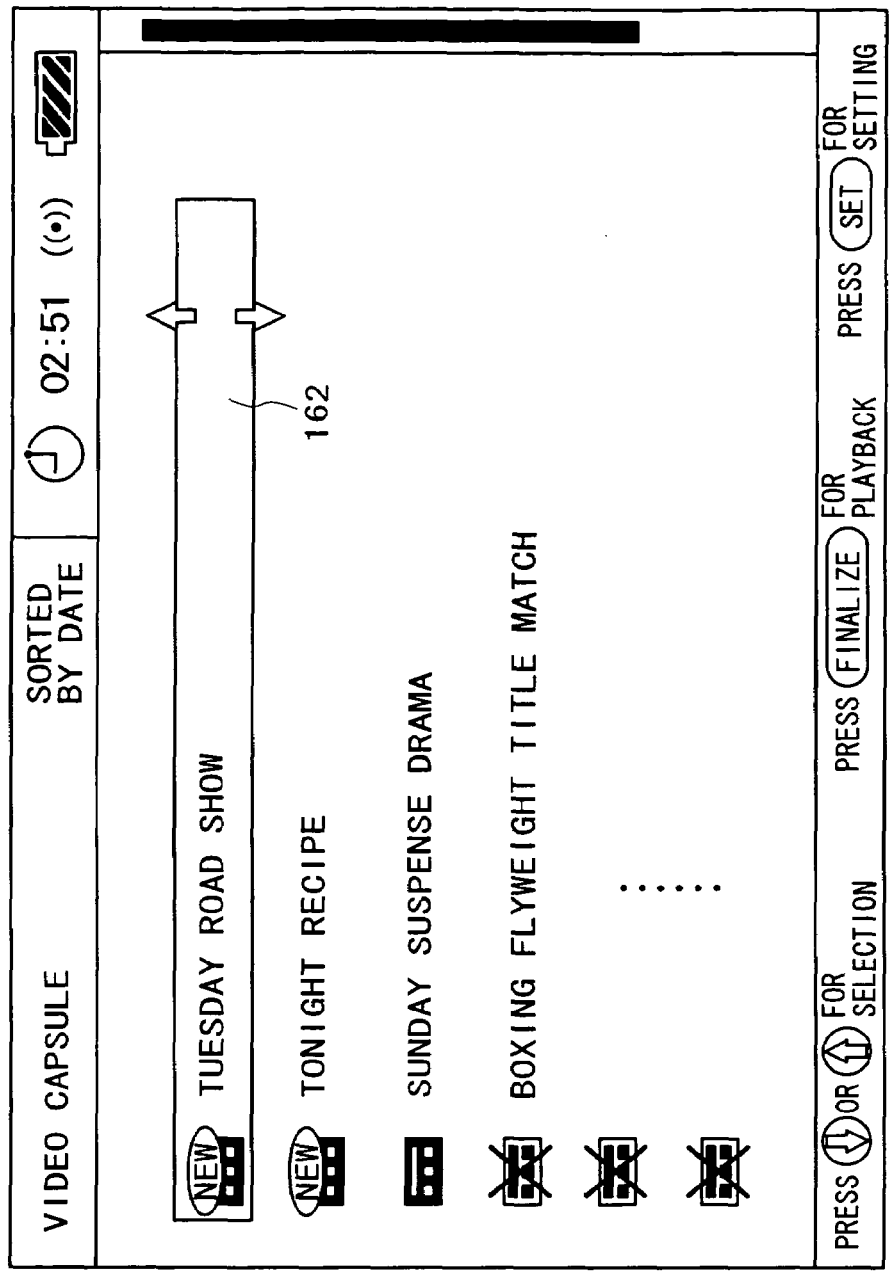
FIG. 23 shows an example of a title menu screen image.
Figure 24:
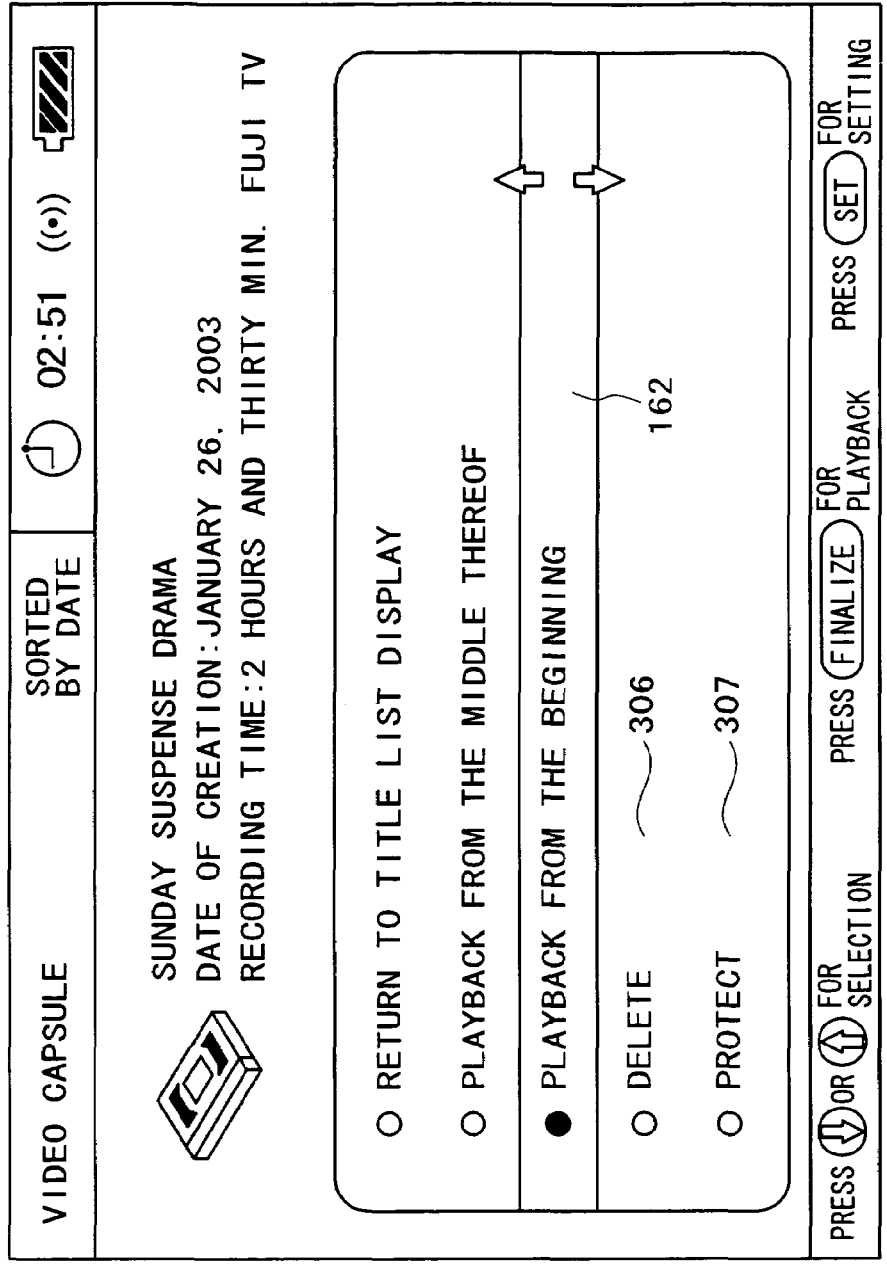
FIG. 24 shows a case where an item "Playback from the beginning" contained in a playback selection menu screen image is highlighted.

The system controller 61 checks the counter information specified in the title information 217 read into the buffer memory 95 to see if reproduction of a motion picture stream that is in progress immediately before the power supply is turned off has been suspended in the middle thereof (step 2103). In other words, reproduction of a motion picture stream that is executed last before the power supply is turned off is checked to see if it has been suspended in the middle thereof. Specifically, for example, a flag signifying that 0:00:0 is or is not specified as the counter information is set, and whether a motion picture stream whose reproduction has been suspended in the middle thereof is found is verified based on whether the flag is present. If the motion picture stream whose reproduction has been suspended in the middle thereof is not found, the system controller 61 displays a title menu (title list) screen image 160 like the one shown in FIG. 23 (step 2104). At this time, the system controller 61 uses the OSD software 156 to highlight 162 a menu item indicating a content disposed, for example, uppermost in the title list. When the user presses the key operating unit 3, the system controller 61 vertically shifts the highlighted field 162. The user selects a desired content by vertically shifting the highlighted field 162, and presses the Enter key 31 (step 2105). The system controller 61 in turn displays, as shown in FIG. 24, a playback selection menu screen image 170 that presents a plurality of menu items so as to allow a user to instruct processing to be performed on the selected content. The system controller 61 uses the OSD software 156 to display a menu item "Playback from the beginning," which allows a user to instruct reproduction of the selected content from the beginning, with the menu item highlighted in advance (step 2106). If the user presses the Enter key 31 or Playback button 43 with "Playback from the beginning" highlighted (step 2107), the system controller 61 reproduces the selected content from the beginning (step 2108). Specifically, at step 2108, the system controller 61 references the table 175 to sample the playback table ID number and intra-picture information file ID number associated with the title of the selected content. Based on the playback table 210 and intra-picture information file 111 identified with the sampled ID numbers, the system controller 61 reads data from the HDD 24 orderly from the leading intra-picture.

To be more specific, a motion picture stream read from the HDD 24 is transferred to the buffer memory 95 through direct memory access (DMA) and thus buffered. Thereafter, the motion picture stream is transferred to the MPEG-2 decoder 89 through DMA and then decoded. The LCD controller 99 drives the LCD 21 according to motion picture data sent from the MPEG-2 decoder 89. Consequently, a motion picture is displayed on the screen of the LCD 21. On the other hand, audio data decoded by the MPEG-2 decoder 89 is converted into an analog signal by the D/A converter 101, and then transmitted to a headphone plugged into the headphone terminal 10.

After the step 2102, if a content of a motion picture stream is not found in the HDD 24, a screen image (not shown) signifying, for example, that no content is found is displayed. The system controller 61 verifies whether a content is found by checking if the table of the title information 217 is stored in the HDD 24, that is, if the table of the title information 217 is present.

The playback selection menu screen image 170 presents as menu items, in addition to "Playback from the beginning" for instructing that a content selected through the title menu screen image 160 should be reproduced from the beginning, "Playback from the middle thereof" for instructing that the content should be reproduced from a middle position therein at which reproduction has been suspended previously, "Delete" for instructing that the content should be deleted, "Return to title list display" for instructing that the title menu screen image 160 should be displayed, and "Protect" for instructing that the content should be protected. Any of the menu items presented by the playback selection menu screen image 170 can be selected by vertically shifting the highlighted field 162.

If the user presses a content reproduction stop button in the middle of reproduction (step 2109), the system controller 61 acts as described below. For example, the system controller 61 references the intra-picture information file 111 to preserve a position of an intra-picture in the hard disk of the HDD 24 and a time instant (counter information), at which reproduction has been suspended in the middle thereof, in, for example, the buffer memory 95 (step 2110). The system controller 61 preserves positions of intra-pictures in the HDD 24 and time instants, at which reproductions have been suspended in the middle thereof, in the form of a table 180 shown in FIG. 26. The table 180 may be preserved together with the table of the title information 217.

Figure 25:
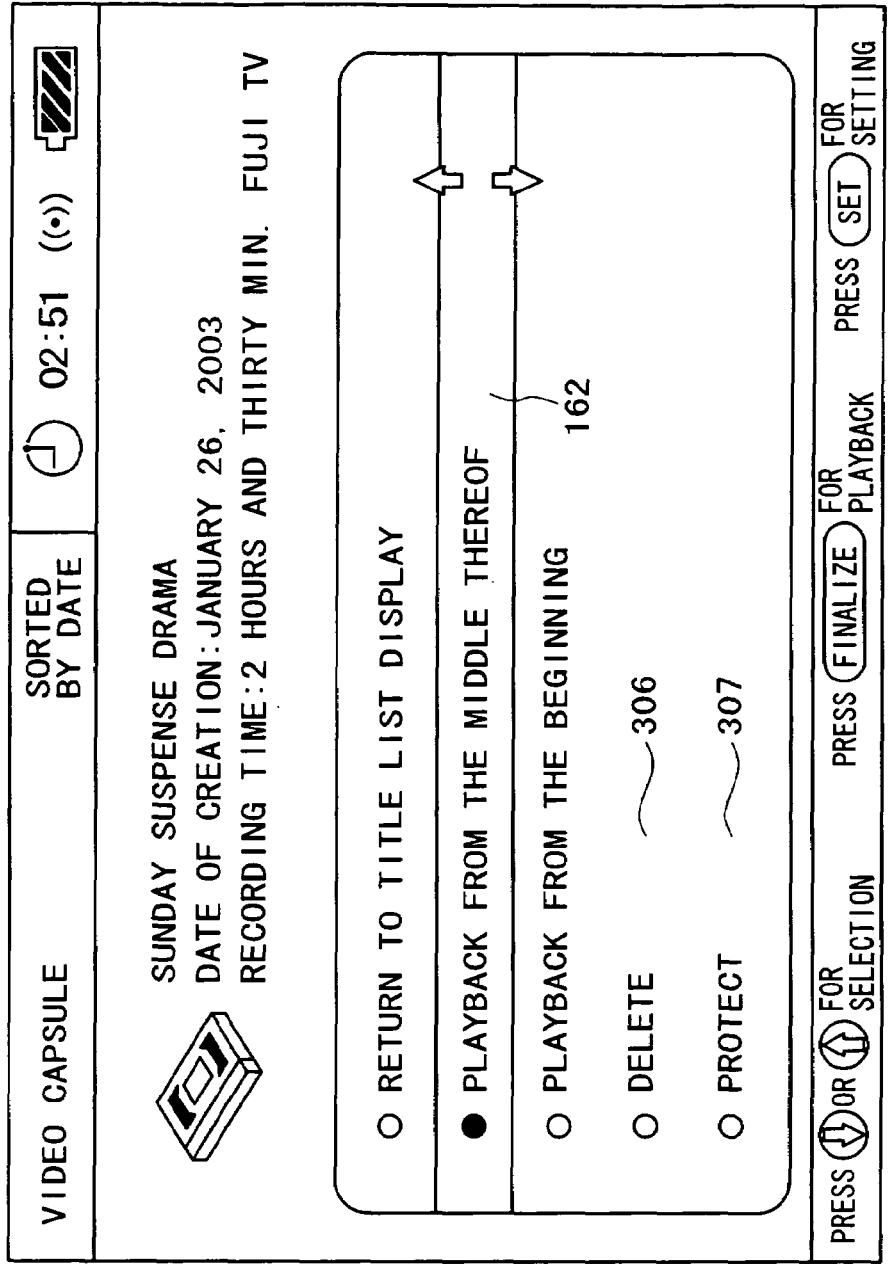
FIG. 25 shows a case where an item "Playback from the middle thereof" contained in the playback selection menu screen image is highlighted.

If reproduction of a motion picture stream that is in progress immediately before the power supply is turned off is verified at step 2103 to have been suspended in the middle thereof, or after step 2110 is completed, the system controller 61 displays the playback selection menu screen image 170 as shown in FIG. 25. Moreover, the system controller 61 uses the OSD software 156 to display "Playback from the middle thereof," which allows a user to instruct reproduction of a selected content from the middle thereof, with the menu item highlighted in advance (step 2111). Thereafter, if the user presses the Enter key 31 or Playback button 43 again with "Playback from the middle thereof" highlighted, the system controller 61 reproduces the selected content from the middle thereof (step 2113). At step 2113, the system controller 62 references the table 180 to read a leading sector ID number, with which a leading sector in which an intra-picture contained in the content whose reproduction has been suspended is recorded is identified, and then reproduces the content.

As mentioned above, according to the present embodiment, assuming that a user suspends reproduction in the middle of the reproduction and turns off the power supply, when the power supply is turned on next, the playback selection menu 170 relevant to the content whose reproduction has been suspended in the middle thereof is displayed. Moreover, the menu item "Playback from the middle thereof" for instructing reproduction from a middle position at which reproduction has been suspended is displayed while being highlighted in advance (step 2111). Consequently, the user need not worry about whether to reproduce a content from the beginning or the middle thereof. The user should merely press the Enter key 31 or Playback button 43 without the necessity of shifting the highlighted field 162 with the menu item highlighted in advance. This would prove user-friendly and helpful. For example, when the user uses the portable HDD motion picture playback device 100 outdoors, the number of manipulations to be performed on the device can be reduced. Consequently, the number of incorrect manipulations can be reduced. Specifically, for example, when a user uses the portable HDD motion picture playback device 100 in trains to enjoy a motion picture, the user has to repeat reproduction of a motion picture stream and suspension of the reproduction every time the user changes trains. In this case, the present invention would prove helpful.

At step 2103, if the system controller 61 verifies that contents specified in the title information 217 include a content associated with counter information which is not 0:00:0, that is, a content whose reproduction has been suspended in the middle thereof, the system controller 61 displays the playback selection menu screen image shown in FIG. 25. Moreover, the system controller 61 highlights "Playback from the middle thereof" which allows a user to instruct production of the selected content from the middle thereof (step 2111). In this case, the title menu screen image 160 is not displayed. If a user presses the Enter key 31 or Playback button 43 with "Playback from the middle thereof" highlighted (step 2112), the system controller 61 reproduces the selected content from the middle thereof (step 2113). Consequently, the user need not worry about whether to reproduce the content from the beginning or the middle thereof. The user should merely finalize the highlighted item. This would prove user-friendly and helpful. Moreover, the number of incorrect manipulations can be reduced.

After the system controller 61 reproduces the content to the end, the system controller 61 displays the playback selection menu screen image 170 relevant to the content, and highlights "Playback from the beginning." If the user selects "Return to title list display" through the screen image and presses the Enter key 31, the title menu screen image 160 is displayed. The title of the content that has been reproduced previously is highlighted.

Figure 22:
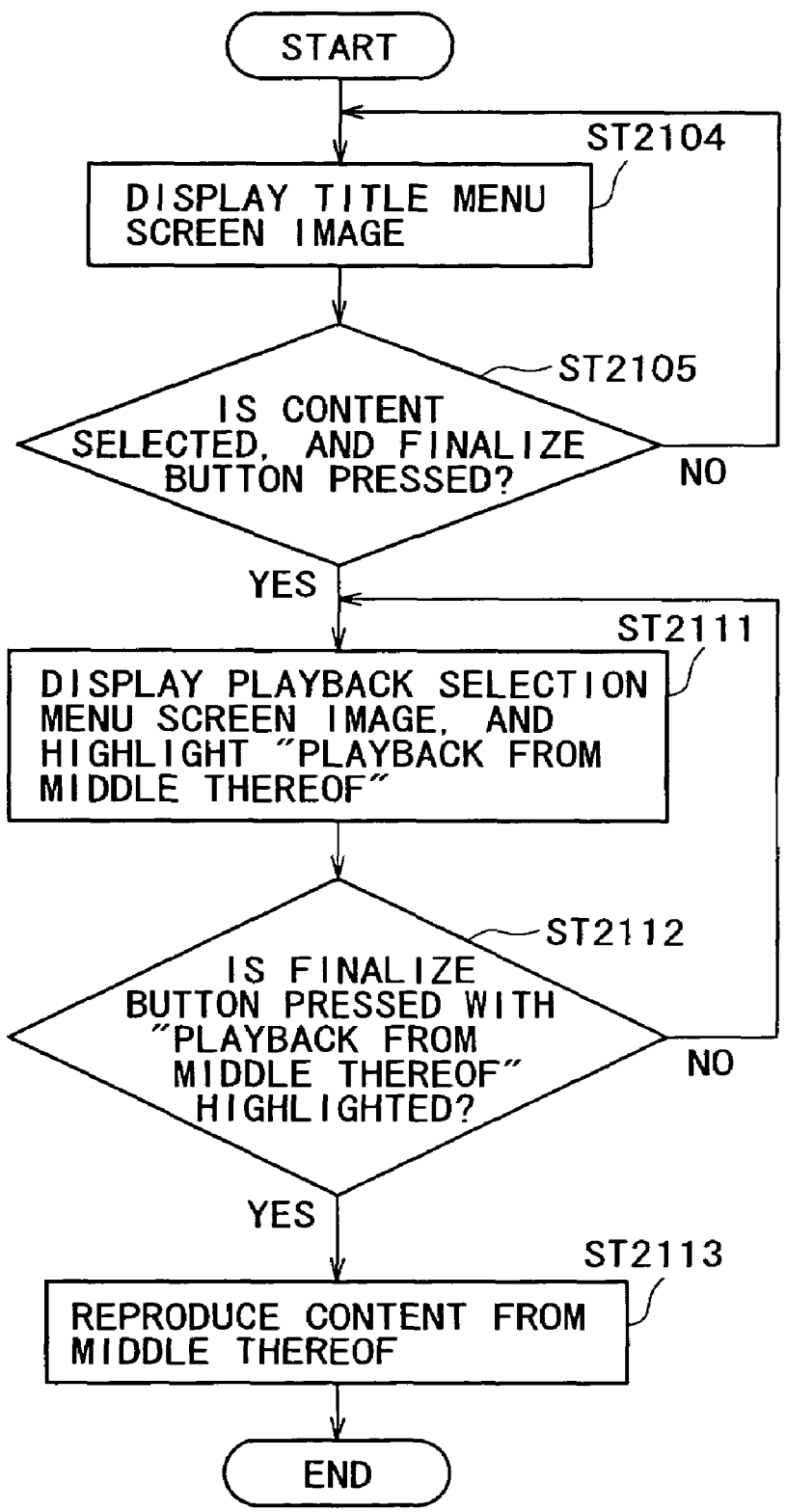
FIG. 22 is a flowchart describing reproduction to be performed in a case where reproduction of a motion picture stream other than a motion picture stream that has been reproduced immediately previously is previously suspended in the middle thereof.

Another conceivable case is such that a content whose reproduction has been suspended in the middle thereof is found other than a content whose reproduction is in progress immediately previously, and a user wants to reproduce the content. FIG. 22 is a flowchart describing actions to be performed in such a case.

As described in the drawing, for example, "Playback from the beginning" or "Playback from the middle thereof" is highlighted in the playback selection menu screen image 170. In this state, a user selects "Return to title list display" and presses the Enter key 31. The system controller 61 displays the title menu screen image (step 2104). The user then selects a content other than a content whose reproduction is in progress immediately previously. The playback selection menu screen image is then displayed, and "Playback from the middle thereof" is highlighted relative to the content (step 2111). Thereafter, the same actions as the foregoing ones are performed.

Figure 27:
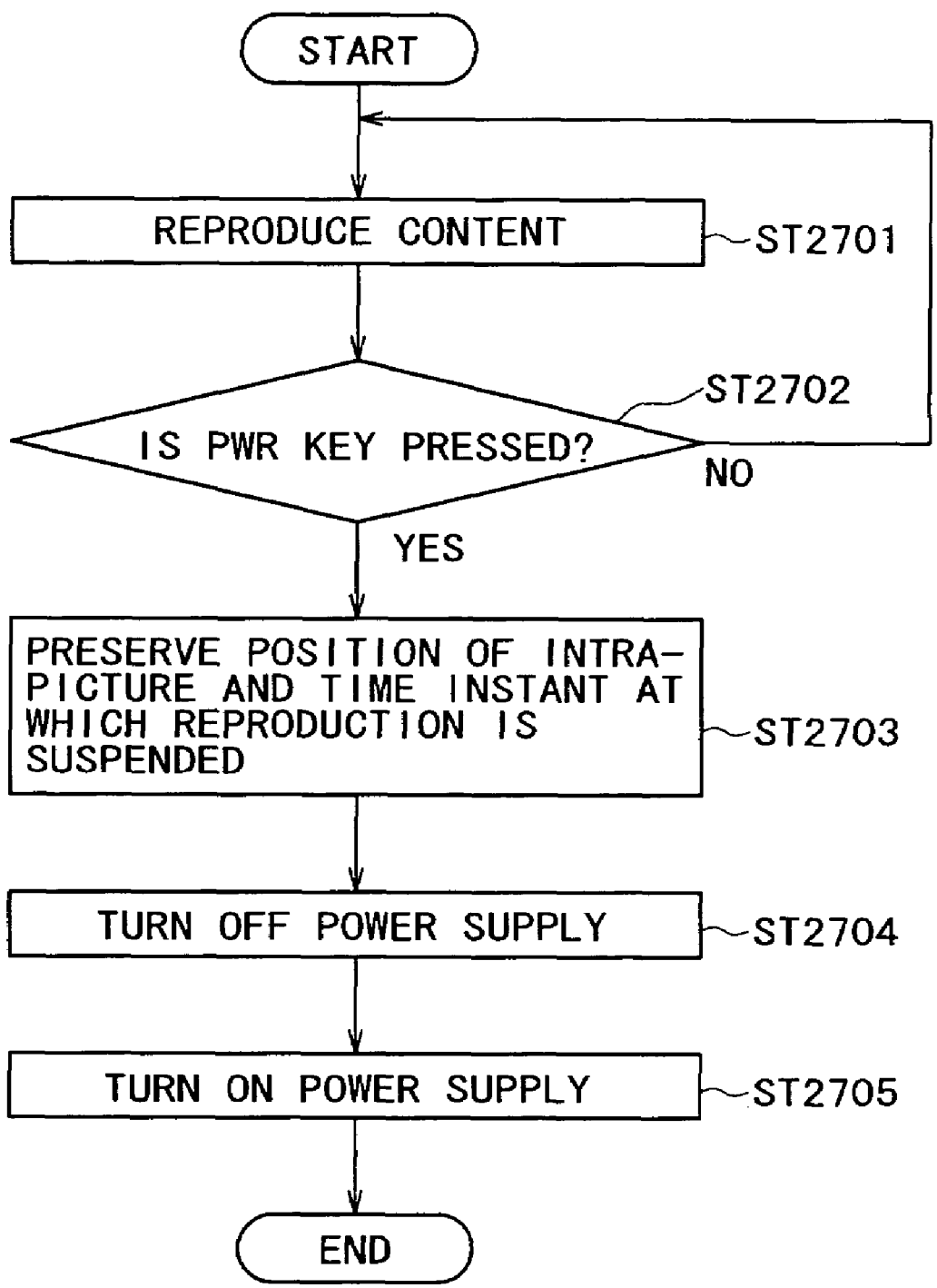
FIG. 27 is a flowchart describing actions to be performed in a case where a power supply is turned off and then turned on again.

Next, a description will be made of actions to be performed in a case where a user turns off the power supply during reproduction of a content, and then turns on the power supply again. FIG. 27 is a flowchart describing the actions.

For example, during reproduction of a content (step 2701), a user presses the Power key 62 (power supply turnoff instruction) (step 2702). The system controller 61 preserves a position of an intra-picture in the hard disk of the HDD 24 and a time instant, at which reproduction is suspended in the middle thereof, in, for example, the HDD 24 (step 2703). In this case, as mentioned above, the system controller 61 preserves positions of intra-pictures in the HDD 24 and time instants, at which reproductions are suspended in the middle thereof, in the form of the table 180 shown in FIG. 26. The table 180 may be stored together with the table of the title information 217. Thereafter, the system controller 61 turns off the power supply (step 2704).

After the power supply is turned off, the user presses the Power key 62 so as to turn on the power supply (step 2705). Thereafter, the system controller 61 performs actions described in the flowchart of FIG. 21.

After the power supply is turned off in the middle of reproduction of a content, if the Power key 62 is pressed in order to turn on the power supply, the portable HDD motion picture playback device 100 displays the playback selection menu relevant to the content whose reproduction is in progress immediately before the power supply is turned off but does not display the title menu screen image. Moreover, the menu item "Playback from the middle thereof" for instructing that a content should be reproduced from a middle position therein at which reproduction has been suspended is highlighted.

Therefore, even if a user turns off the power supply during reproduction of a content but does not perform manipulations to suspend reproduction of the content, the user should merely turn on the power supply at the next time. The playback selection menu 170 relevant to the content whose reproduction has been suspended previously is displayed. Thus, the user would find it user-friendly because he/she need not search for the content, of which reproduction has been suspended previously, from among a plurality of contents. The user should merely press the Enter key 31 or Playback button 43 with the menu item "Playback from the middle thereof," which allows a user to instruct reproduction of a content from a middle position at which the reproduction has been suspended previously, left highlighted but need not shift the highlighted field 162. Thus, reproduction of the content is initiated. Since the number of manipulations to be performed is small, it would prove easy to use. Moreover, incorrect manipulations will hardly be performed.

If a user selects and finalizes the item 306 "Delete" through the playback selection menu screen image 170, a motion picture stream identified with the title of a content that is reproduced last is deleted from the HDD 24. Namely, a motion picture stream identified with the title of a content the user has enjoyed can be deleted from the HDD 24 by performing a small number of manipulations. Moreover, if the user selects and finalizes the item 307 "Protect," a motion picture stream concerned and recorded in the HDD 24 is protected from being deleted.

Figure 28:
FIG. 28 shows another form of the playback selection menu screen image displayed on a screen unit.

FIG. 28 shows another form of the playback selection menu screen image displayed on the screen unit 2. For a playback selection menu screen image 185, compared with for the aforesaid playback selection menu screen image, the system controller 61 displays information on a content, of which reproduction has been suspended in the middle thereof, in more details. Specifically, the system controller 61 displays a counter indicator 186 indicating a time instant at which reproduction of the selected content has been suspended. The system controller 61 may display a time passage bar 187 along with the counter indicator 186. The time passage bar 187 moves rightwards with the passage of a reproduction time during which a content is reproduced. This helps a user visually grasp a remaining reproduction time required for a content whose reproduction has been suspended in the middle thereof.

Actions to be performed in order to display the counter indicator 186 will be described below. As described in FIG. 21, at step 2110, the system controller 61 references the intra-picture information file 111 so as to preserve a position of an intra-picture and a time instant at which reproduction has been suspended. At step 2111, the system controller 61 displays, as shown in FIG. 28, the preserved time instant in the playback selection menu screen image 185. After the power supply is turned on (step 2605) as described in FIG. 27, the system controller 61 displays the playback selection menu screen image 185 shown in FIG. 28. The system controller 61 uses a bitmap stored in the HDD 24 or flash ROM 104 in advance to display the counter indicator 186.

According to the present embodiment, the playback selection menu screen image 185 would prove helpful because it helps a user grasp a position or a time instant at which reproduction of a content is suspended.

Figure 29:
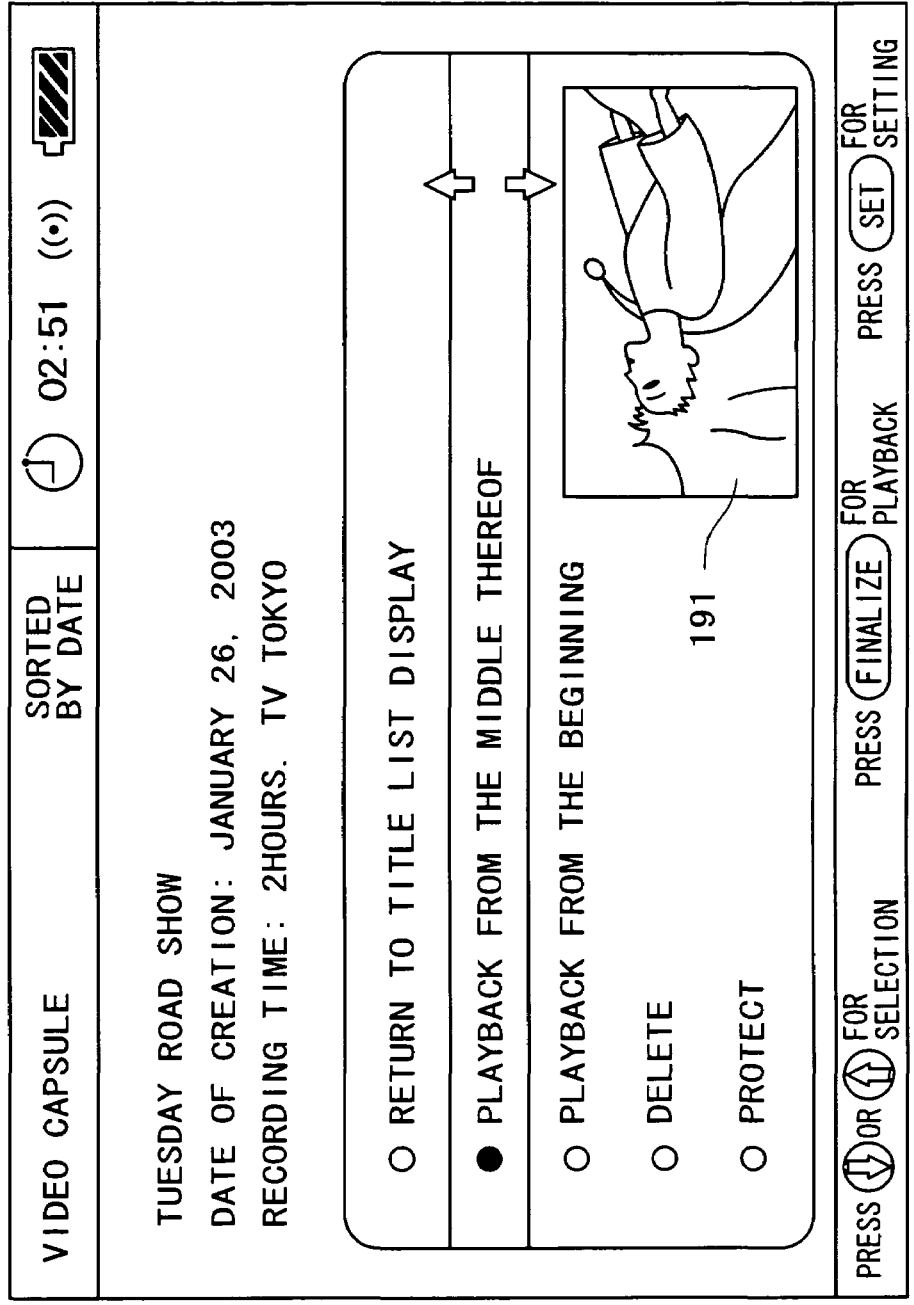
FIG. 29 shows another form of the playback selection menu screen image displayed on the screen unit.

FIG. 29 shows another form of the playback selection menu screen image displayed on the screen unit 2. For a playback selection menu screen image 190, the system controller 61 displays information on a content, of which reproduction has been suspended in the middle thereof, in more details. Specifically, the system controller 61 displays an intra-picture 191 which is part of a selected content and at the position of which reproduction of the content has been suspended. This helps a user grasp an image, at the position of which reproduction has previously been suspended in the middle thereof, through the playback selection menu screen image 190.

Figure 30:
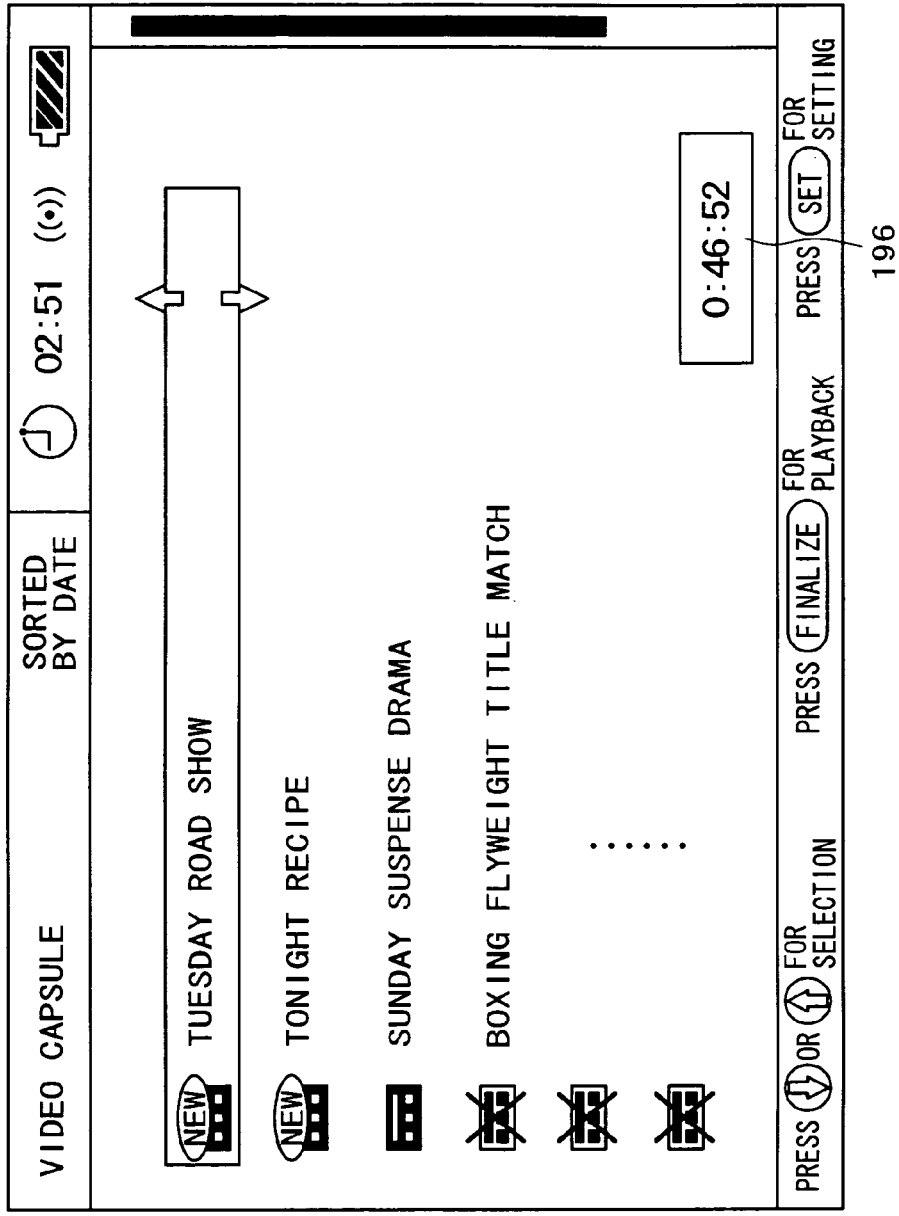
FIG. 30 shows another form of the playback selection menu screen image displayed on the screen unit.

FIG. 30 shows another form of the title menu screen image displayed on the screen unit 2. For a title menu screen image 195, the system controller 61 displays information on a content, of which reproduction has been suspended in the middle thereof, in more details. Specifically, the system controller 61 displays a counter indicator 196 that indicates a time instant at which reproduction of a selected content has been suspended in the middle thereof. For example, at step 2111 in FIG. 21, after a user selects and finalizes "Return to title list display," the title menu screen image 195 is displayed. Moreover, the system controller 61 may display, in addition to or on behalf of the counter indicator 196, an intra-picture at the position of which reproduction has been suspended.

According to the present embodiment, the title menu screen image 195 would prove helpful because it helps a user grasp a position in a content or a time instant at which reproduction of the content has been suspended. In particular, when the titles of a plurality of contents are displayed as those in the title menu screen image 195, every time a user changes the highlighted field from one of the titles of the contents to another, the counter indicator indicates a time instant at which reproduction of the content has been suspended. This helps a user grasp whether reproduction of a content whose title is highlighted has been suspended previously, and improves ease of use.

In addition to the counter indicator, an icon indicating that reproduction has been suspended in the middle thereof may be displayed.

The foregoing invention has been described in terms of preferred embodiments. However, those skilled, in the art will recognize that many variations of such embodiments exist. Such variations are intended to be within the scope of the present invention and the appended claims.

What is claimed is:

1. Electronic equipment comprising:
   a display unit on which a playback selection menu that prompts a user to select either head playback in which a content is reproduced from a beginning or middle playback in which the content is reproduced from a middle thereof can be displayed;
   a reproducing means for displaying the content on the display unit so as to thus reproduce it;
   a highlighting means for highlighting one of menu items, which are contained in the playback selection menu, on the display unit so that the menu item will be selected;
   a means for, in response to a power supply turnoff instruction issued during reproduction of the content by the reproducing means, storing information on a middle position in the content at which reproduction has been suspended; and
   a control unit configured to cause the display unit to display the playback selection menu when the power supply is turned on and when the information on the middle position in the content at which reproduction has been suspended is stored, and to cause the highlighting means to highlight a menu item indicating that reproduction will resume from a point where reproduction was suspended based on the stored information on the middle position in the content.

2. The electronic equipment according to claim 1, wherein:
when the power supply is turned on, whether the information on a middle position is stored is verified;
if the information on the middle position is verified not to be stored, control is extended so that the playback selection menu will be displayed on the display unit and the highlighting means will highlight a menu item indicating head playback.

3. The electronic equipment according to claim 1, further comprising a counter means for displaying a counter indicator, which indicates a reproduced position in the content or a reproduction time, on the display unit together with the playback selection menu.

4. The electronic equipment according to claim 1, further comprising a means for when the control unit extends control so that the menu item indicating middle playback will be highlighted, displaying an image, which is disposed at the middle position in the content, on the display unit together with the playback selection menu.

5. The electronic equipment according to claim 1, wherein a title menu presenting titles of contents can be displayed on the display unit, further comprising:
a counter means for displaying a counter indicator, which indicates a reproduced position in the content or a reproduction time, on the display unit together with the title menu.

6. Electronic equipment comprising:
a reproduction control means for controlling reproduction of a content and controlling suspension of the reproduction when a power supply is turned off;
a display unit on which a playback selection menu that prompts a user to select either head playback in which the content is reproduced from a beginning or middle playback in which the content is reproduced from a middle thereof, and the content reproduced by the reproduction control means can be displayed;
a highlighting means for highlighting one of menu items, which are contained in the playback selection menu, on the display unit so that the menu item will be selected; and
a control unit configured to cause the display unit to display the playback selection menu when the power supply is turned on and when the reproduction control means previously suspended reproduction of the content, and to cause the highlighting means to highlight a menu item indicating that reproduction will resume from a point where reproduction was suspended.

7. A highlighting method comprising the steps of:
displaying on a display unit a playback selection menu that prompts a user to select either head playback in which a content is reproduced from a beginning or middle playback in which the content is reproduced from a middle thereof;
highlighting one of menu items, which are contained in the playback selection menu, on the display unit so that the menu item will be selected;
reproducing the content according to the highlighted menu item contained in the playback selection menu;
in response to a power supply turnoff instruction issued during reproduction of the content, storing information on a middle position in the content at which reproduction has been suspended; and
when the power supply is turned on, displaying the playback selection menu when the information on the middle position in the content at which reproduction has been suspended is stored, and highlighting a menu item indicating that reproduction will resume from a point where reproduction was suspended based on the stored information on the middle position in the content.

8. A highlighting method comprising the steps of:
displaying on a display unit a playback selection menu that prompts a user to select either head playback in which a content is reproduced from a beginning or middle playback in which the content is reproduced from a middle thereof;
highlighting one of menu items, which are contained in the playback selection menu, on the display unit so that the menu item will be selected;
reproducing the content according to the highlighted menu item contained in the playback selection menu;
suspending the reproduction of the content in the middle of the reproduction when a power supply is turned off; and
displaying the playback selection menu when the power supply is turned on and when the reproduction of the content was previously suspended, and highlighting a menu item indicating that reproduction will resume from a point where reproduction was suspended.

9. A computer readable storage medium encoded with computer executable instructions, which when executed by a computer, cause the computer to perform a method comprising:
displaying on a display unit a playback selection menu that prompts a user to select either head playback in which a content is reproduced from a beginning or middle playback in which the content is reproduced from a middle thereof;
highlighting one of menu items, which are contained in the playback selection menu, on the display unit so that the menu item will be selected;
reproducing the content according to the highlighted menu item contained in the playback selection menu;
in response to a power supply turnoff instruction issued during reproduction of the content, storing information on a middle position in the content at which reproduction has been suspended; and
when the power supply is turned on, displaying the playback selection menu when the information on the middle position in the content at which reproduction has been suspended is stored, and highlighting a menu item indicating that reproduction will resume from a point where reproduction was suspended based on the stored information on the middle position in the content.

10. A computer readable storage medium encoded with computer executable instructions, which when executed by a computer, cause the computer to perform a method comprising:
displaying on a display unit a playback selection menu that prompts a user to select either head playback in which a content is reproduced from a beginning or middle playback in which the content is reproduced from a middle thereof;
highlighting one of menu items, which are contained in the playback selection menu, on the display unit so that the menu item will be selected;
reproducing the content according to the highlighted menu item contained in the playback selection menu;

suspending the reproduction of the content in the middle of the reproduction when a power supply is turned off; and displaying the playback selection menu when the power supply is turned on and when the reproduction of the content was suspended, and highlighting a menu item indicating that reproduction will resume from a point where reproduction was suspended.

11. Electronic equipment comprising:

a recording means in which a plurality of contents is recorded;

a contents listing means for listing at least titles as information on the plurality of contents recorded in the recording means;

a playback selection menu display means on which a playback selection menu containing at least both an item for instructing reproduction of a content from a beginning and an item for instructing reproduction of the content from a position of suspension is displayed;

a highlighting means for highlighting one of the items so that the item will be selected;

a reproducing means for reproducing the content according to the selected item;

a position-of-suspension storing means for storing information on a position of suspension at which reproduction of the content has been suspended in the middle thereof when a power supply is turned off;

a state detecting means for when the power supply is turned on, detecting based on the information on the position of suspension whether a last reproduction of a content has been suspended in the middle thereof; and a control means configured to cause the playback selection menu display means to display the playback selection menu when the power supply is turned on and when the last reproduction of a content has been suspended in the middle thereof, and to cause the highlighting means to highlight a menu item indicating that reproduction will resume from the position of suspension.

12. A highlighting method comprising the steps of:

recording a plurality of contents in a recording unit;

listing at least titles as information on the plurality of contents recorded in the recording unit;

displaying a playback selection menu that contains at least both an item for instructing reproduction of content from a beginning and an item for instructing reproduction of the content from a position of suspension;

highlighting one of the items so that the item will be selected;

reproducing the content according to the selected item;

storing information on a position of suspension at which reproduction of the content has been suspended in the middle thereof when a power supply is turned off;

when the power supply is turned on, detecting based on the information on the position of suspension whether the last reproduction of a content has been suspended in the middle thereof; and displaying the playback selection menu when the power supply is turned on and when the last reproduction of a content has been suspended in the middle thereof, highlighting a menu item indicating that reproduction will resume from the position of suspension.

13. Electronic equipment comprising:

a display unit on which a playback selection menu that prompts a user to select either head playback in which a content is reproduced from a beginning or middle playback in which the content is reproduced from a middle thereof can be displayed;

a reproducing means for displaying the content on the display unit so as to thus reproduce it;

a highlighting means for highlighting one of menu items, which are contained in the playback selection menu, on the display unit so that the menu item will be selected;

a means for, in response to a power supply turnoff instruction issued during reproduction of the content by the reproducing means, storing information on a middle position in the content at which reproduction has been suspended, and turning off a power supply; and a control unit for when the power supply is turned on, if the information on the middle position is stored, extending control so that the playback selection menu will be displayed on the display unit and the highlighting means will highlight a menu item indicating middle playback, wherein, when the power supply is turned on, whether the information on a middle position is stored is verified, and if the information on the middle position is verified not to be stored, control is extended so that the playback selection menu will be displayed on the display unit and the highlighting means will highlight a menu item indicating head playback.

14. Electronic equipment comprising:

a display unit on which a playback selection menu that prompts a user to select either head playback in which a content is reproduced from a beginning or middle playback in which the content is reproduced from a middle thereof can be displayed;

a reproducing unit configured to display the content on the display unit so as to thus reproduce it;

a highlighting unit configured to highlight one of menu items, which are contained in the playback selection menu, on the display unit so that the menu item will be selected;

a storing unit configured to, in response to a power supply turnoff instruction issued during reproduction of the content by the reproducing unit, store information on a middle position in the content at which reproduction has been suspended; and a control unit configured to cause the display unit to display the playback selection menu when the power supply is turned on and when the information on the middle position in the content at which reproduction has been suspended is stored, and to cause the highlighting unit to highlight a menu item indicating that reproduction will resume from a point where reproduction was suspended based on the stored information on the middle position in the content.

* * * * *